US012044382B2

(12) United States Patent
Scarlata et al.

(10) Patent No.: US 12,044,382 B2
(45) **Date of Patent: *Jul. 23, 2024**

(54) WALLPACK LIGHT FIXTURE

(71) Applicant: Eaton Intelligent Power Limited, Dublin (IE)

(72) Inventors: Andrew F. Scarlata, West Monroe, NY (US); Virginia Merriam, Clay, NY (US); Pradeep Bangalore Venugopal, Karnataka (IN); Priya Ranjan Haridasan, Kerala (IN); Ramashesan Subramaniyan, Tamil Nadu (IN); Pareekshith Parashiva Murthy, Karnataka (IN); Daniel Treible, Liverpool, NY (US); Patrick Blincoe, Kirkville, NY (US); Gangadhar Mestri, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 37 days.

This patent is subject to a terminal disclaimer.

(21) Appl. No.: 17/498,403

(22) Filed: Oct. 11, 2021

(65) Prior Publication Data

US 2022/0412521 A1 Dec. 29, 2022

Related U.S. Application Data

(63) Continuation of application No. 16/667,026, filed on Oct. 29, 2019, now Pat. No. 11,143,368.

(51) Int. Cl.
*F21S 8/00* (2006.01)
*F21V 15/01* (2006.01)
(Continued)

(52) U.S. Cl.
CPC .............. *F21S 8/033* (2013.01); *F21V 15/01* (2013.01); *F21V 23/002* (2013.01); *F21V 23/02* (2013.01);
(Continued)

(58) Field of Classification Search
CPC ........ F21V 29/763; F21V 29/87; F21V 15/01; F21V 23/002; F21V 23/02; F21V 23/009;
(Continued)

(56) References Cited

U.S. PATENT DOCUMENTS

D256,057 S ‡ 7/1980 Ichikawa ........................ D26/29
4,498,126 A ‡ 2/1985 Hernandez .............. F21V 19/04 362/306

(Continued)

OTHER PUBLICATIONS

European Search Report for European Application No. 19205220.7, Feb. 26, 2020, 18 pages, The Hague, Netherlands.‡

(Continued)

*Primary Examiner* — Kevin Quarterman
(74) *Attorney, Agent, or Firm* — Stinson LLP

(57) ABSTRACT

The present disclosure is directed to wallpacks containing at least one light source, such as a light-emitting diode (LED). The wallpack light fixtures disclosed herein generally contain a housing, at least one light source, a power supply, and a plurality of heat sink fins.

16 Claims, 24 Drawing Sheets

(51) Int. Cl.
*F21V 23/00* (2015.01)
*F21V 23/02* (2006.01)
*F21V 29/76* (2015.01)
*F21V 29/87* (2015.01)
*F21Y 115/10* (2016.01)

(52) U.S. Cl.
CPC ............ *F21V 29/763* (2015.01); *F21V 29/87* (2015.01); *F21Y 2115/10* (2016.08)

(58) Field of Classification Search
CPC .. F21V 23/0464; F21V 23/023; F21V 19/001; F21V 23/003; F21V 29/507; F21V 29/70; F21V 5/04; F21S 8/033; F21S 8/00; F21Y 2115/10
See application file for complete search history.

(56) References Cited

U.S. PATENT DOCUMENTS

| | | | | | |
|---|---|---|---|---|---|
| D289,086 | S ‡ | 3/1987 | Yabata | D26/29 | |
| D291,252 | S ‡ | 8/1987 | Ichikawa | D26/29 | |
| D293,824 | S ‡ | 1/1988 | Ichikawa | D26/29 | |
| D353,474 | S ‡ | 12/1994 | Shyan | D26/63 | |
| D413,689 | S ‡ | 9/1999 | Hussaini | D26/29 | |
| 6,283,617 | B1 ‡ | 9/2001 | Stekelenburg | F21S 8/033 | 362/399 |
| 7,175,300 | B1 ‡ | 2/2007 | Medeiros | F21V 19/008 | 362/648 |
| D547,477 | S ‡ | 7/2007 | Guercio | D26/63 | |
| D565,223 | S ‡ | 3/2008 | Guercio | D26/63 | |
| D574,102 | S ‡ | 7/2008 | Quiogue | D26/63 | |
| D598,144 | S ‡ | 8/2009 | Ko | D26/28 | |
| 7,651,245 | B2 ‡ | 1/2010 | Thomas | F21V 29/74 | 362/249.02 |
| D610,734 | S ‡ | 2/2010 | Ward | D26/74 | |
| 7,682,036 | B2 ‡ | 3/2010 | Reiff | F21V 25/12 | 362/228 |
| D634,873 | S ‡ | 3/2011 | Guercio | D26/71 | |
| 8,029,162 | B2 ‡ | 10/2011 | Curran | F21V 31/04 | 362/373 |
| D650,112 | S ‡ | 12/2011 | Bryant | D26/85 | |
| 8,235,555 | B2 ‡ | 8/2012 | Thomas | F21V 29/15 | 362/294 |
| 8,408,740 | B2 ‡ | 4/2013 | Barnwell | F21S 8/03 | 362/147 |
| D693,509 | S ‡ | 11/2013 | Hosick | D26/63 | |
| D699,279 | S ‡ | 2/2014 | Zhan | D16/239 | |
| 8,827,508 | B2 ‡ | 9/2014 | Sagal | B29C 45/14 | 362/373 |
| 8,888,325 | B2 ‡ | 11/2014 | Thomas | F21V 15/01 | 362/249.02 |
| 8,915,617 | B2 ‡ | 12/2014 | Negandhi | F21V 29/87 | 362/249.02 |
| 9,134,019 | B2 ‡ | 9/2015 | Thomas | F21V 29/75 | |
| D744,143 | S ‡ | 11/2015 | Bobel | D26/63 | |
| D744,144 | S ‡ | 11/2015 | Bobel | D26/63 | |
| D770,078 | S ‡ | 10/2016 | Largent | D26/118 | |
| D770,660 | S ‡ | 11/2016 | Yang | D26/71 | |
| D774,675 | S ‡ | 12/2016 | Hong | D26/63 | |
| D775,403 | S ‡ | 12/2016 | Adams | D26/118 | |
| D775,404 | S ‡ | 12/2016 | Adams | D26/118 | |
| 9,523,491 | B2 ‡ | 12/2016 | Bailey | F21V 5/04 | |
| 9,550,449 | B2 ‡ | 1/2017 | Paine | B60Q 1/05 | |
| D784,599 | S ‡ | 4/2017 | Sibitzky | D26/118 | |
| D800,952 | S ‡ | 10/2017 | Shundong | D26/93 | |
| D807,538 | S ‡ | 1/2018 | Guercio | D26/24 | |
| D807,550 | S ‡ | 1/2018 | Tong | D26/35 | |
| D821,239 | S ‡ | 6/2018 | Tong | D10/114.4 | |
| D827,167 | S ‡ | 8/2018 | Deyaf | D26/28 | |
| D836,230 | S ‡ | 12/2018 | Guercio | D26/63 | |
| D839,458 | S ‡ | 1/2019 | Ting | D26/28 | |
| D852,399 | S ‡ | 6/2019 | Chen | D26/63 | |
| D853,005 | S ‡ | 7/2019 | Zou | D26/63 | |
| D853,006 | S ‡ | 7/2019 | Zou | D26/63 | |
| D856,566 | S ‡ | 8/2019 | Deng | D26/71 | |
| D869,725 | S ‡ | 12/2019 | Wang | D26/71 | |
| D870,948 | S ‡ | 12/2019 | He | D26/71 | |
| D905,314 | S ‡ | 12/2020 | Pan | D26/71 | |
| D910,218 | S ‡ | 2/2021 | Somasekar | D26/63 | |
| D911,575 | S ‡ | 2/2021 | Ma | D26/71 | |
| 11,143,368 | B2 * | 10/2021 | Scarlata | F21V 23/02 | |
| 2008/0310162 | A1 ‡ | 12/2008 | Thomas | F21V 29/15 | 362/249.01 |
| 2012/0250321 | A1 ‡ | 10/2012 | Blincoe | F21V 21/00 | 362/249.02 |
| 2012/0268952 | A1 ‡ | 10/2012 | Newton | F21V 7/0066 | 29/854 |
| 2013/0265752 | A1 ‡ | 10/2013 | Shimizu | F21V 29/773 | 362/330 |
| 2015/0167936 | A1 ‡ | 6/2015 | Yong | F21V 5/045 | 362/190 |
| 2015/0351195 | A1 ‡ | 12/2015 | Sargent | F21V 15/01 | 315/158 |
| 2016/0003464 | A1 ‡ | 1/2016 | Thomas | F21S 2/005 | 362/249.02 |
| 2016/0320046 | A1 ‡ | 11/2016 | Duckworth | F21V 21/108 | |
| 2017/0146224 | A1 ‡ | 1/2017 | Myers | G02B 6/0043 | |
| 2017/0307204 | A1 ‡ | 10/2017 | Cattoni | F21V 31/005 | |
| 2018/0283666 | A1 ‡ | 10/2018 | Beausoleil | E04H 17/00 | |
| 2018/0320841 | A1 ‡ | 11/2018 | Elmore | F21V 21/02 | |

OTHER PUBLICATIONS

Office Action dated Mar. 3, 2021 U.S. Appl. No. 29/723,737, 22 pages.‡

* cited by examiner
‡ imported from a related application

100

WALLPACK LIGHT FIXTURE

REFERENCE TO RELATED APPLICATIONS

This application is a continuation of U.S. patent application Ser. No. 16/667,026, filed Oct. 29, 2019, which claims the benefit of U.S. Provisional Application No. 62/752,167, filed Oct. 29, 2018, the entire contents of which are incorporated by reference herein.

FIELD OF THE DISCLOSURE

The present disclosure generally relates to wallpack light fixture.

BACKGROUND

Various types of light fixtures can be mounted to a support structure. One particular type of luminaire is known as a wall pack luminaire. A wallpack light fixture is typically attached to a support structure, such as a vertically oriented wall. Many wallpack light fixtures include housings formed of two or more individual components coupled to one another. The individual components of the housing include at least a mounting portion and a cover coupled to the mounting portion. The wallpack light fixture typically houses one or more light sources (e.g., LEDs) for providing illumination to a desired illuminated area.

SUMMARY

In one aspect, a wallpack light fixture generally comprises a housing having two adjacent body portions each defining an internal volume; at least one light source mounted within the internal volume of the first body portion; a power supply disposed in the internal volume of the second body portion; and a plurality of heat sink fins on the exterior side of the housing.

In another aspect, a wallpack light fixture generally comprises a housing having two adjacent body portions each defining an internal volume; at least one light source mounted within the internal volume of the first body portion; a power supply disposed in the internal volume of the second body portion; and a door pivotally attached the second body portion.

In yet another aspect, a wallpack light fixture generally comprises a housing having two adjacent body portions each defining an internal volume; at least one light source mounted within the internal volume of the first body portion; a power supply disposed in the internal volume of the second body portion; and a raceway disposed between the first and second body portions to connect the power supply to the light source.

BRIEF DESCRIPTION OF THE DRAWING

Corresponding reference characters indicate corresponding parts throughout the drawings.

DETAILED DESCRIPTION OF THE DISCLOSURE

Figure 1:
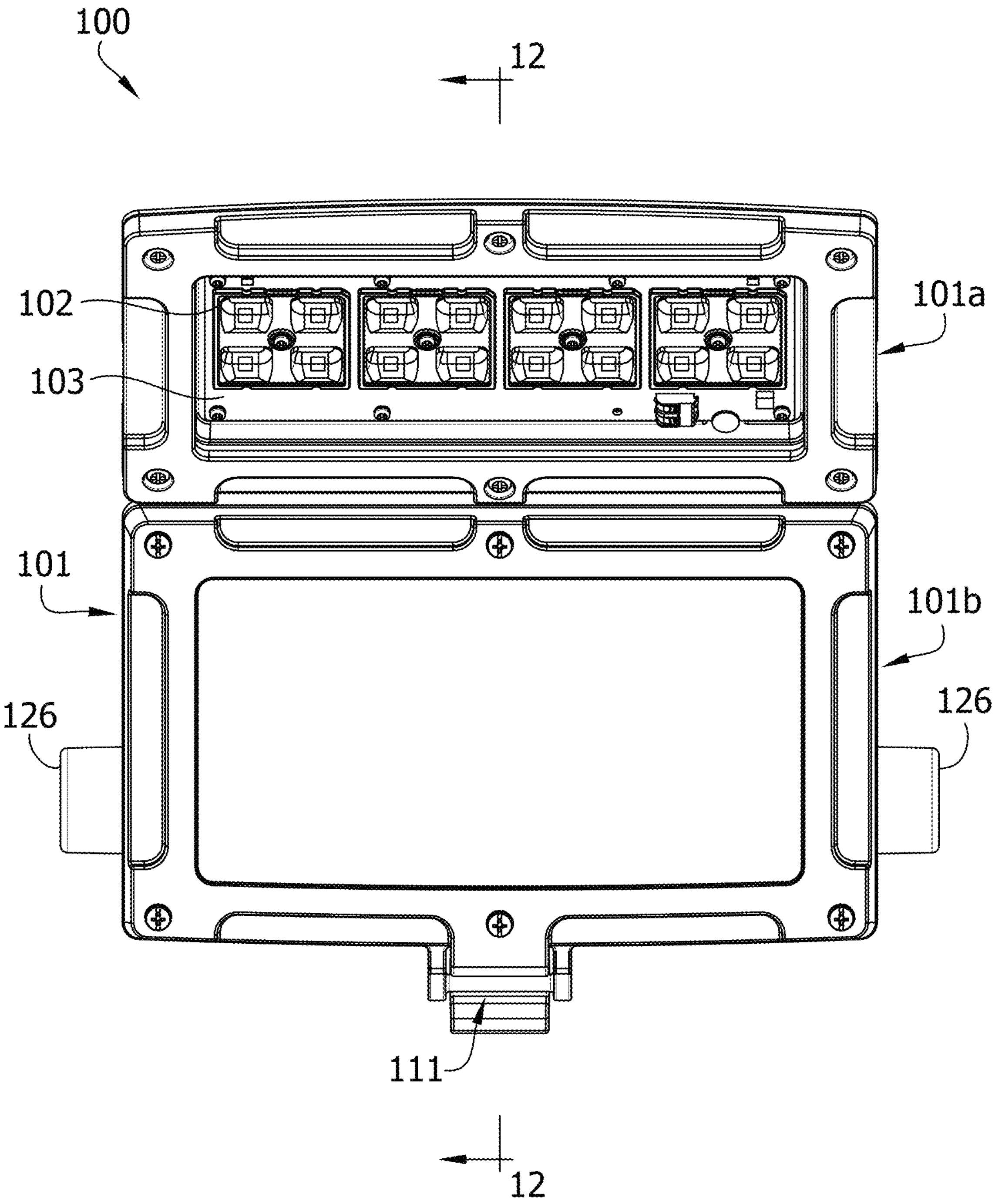
FIG. 1 is a front view of a wallpack light fixture.
Figure 2:
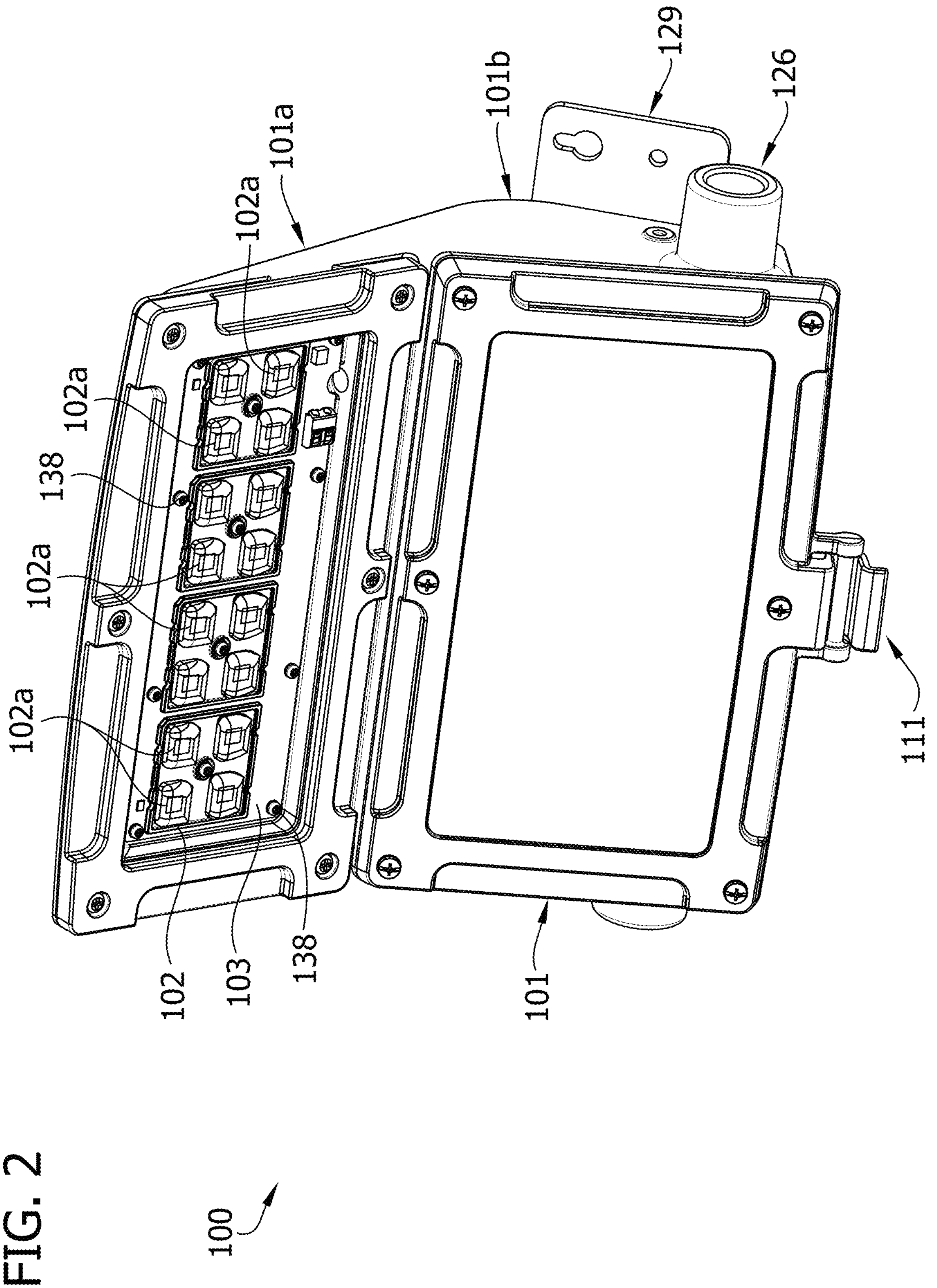
FIG. 2 is a perspective view of the wallpack light fixture.

The present disclosure is directed to wallpack light fixtures containing at least one light source. In general, referring to FIGS. 1-3, the illustrated wallpack light fixture 100 comprises: a housing 101 having adjacent first and second body portions 101*a*, 101*b* each defining an internal volume; at least one light source, such as a light-emitting diode (LED) assembly 102 as illustrated, mounted within the internal volume of the first body portion 101*a*; an electronics assembly 104 disposed in the internal volume of the second body portion 101*b*; and a plurality of heat sink fins 105 on the exterior of the housing 101. The light source can comprise any light source suitable for wallpack applications, including, but not limited to, solid state light sources (e.g., light-emitting diodes (LEDs), organic light-emitting diodes (OLEDs), or polymer light-emitting diodes (PLED)), non-solid state light sources, and lasers. The illustrated wallpack light fixture 100 is compact and suitable for harsh or hazardous locations. The wallpack light fixture 100 can therefore provide a safe light source for wall-mounted industrial applications. The wallpack light fixture 100 can be both corrosion-proof and water-proof or water-resistant in certain embodiments, and can also withstand other hazardous or harsh conditions.

In the illustrated embodiment, the first body portion 101*a* is an upper body portion and the second body portion 101*b* is a lower body portion. In one or more other embodiments, the housing 101 has more than two adjacent body portions. As used herein, "adjacent" is defined as abutting, contiguous, or next to. In embodiments having more than two adjacent body portions, each body portion should be adjacent to at least one other body portion, but not all body portions are required to be adjacent to all other body portions. The illustrated housing 101 is in the form of a single molded, cast, or machined housing. However, the housing 101 can also be in the form of a multi-part molded, cast, or machined housing. The housing 101 can be formed of any thermally conductive material, such as a metal or a metal alloy. Thermally conductive plastic or polymer material may also be used. In some embodiments, the thermally conductive material comprises a metal. In further embodiments, the metal comprises aluminum. The housing 101 can be molded, cast, or machined by any method known in the art, such as by gravity cast, permanent mold, or sandcast.

Figure 12:
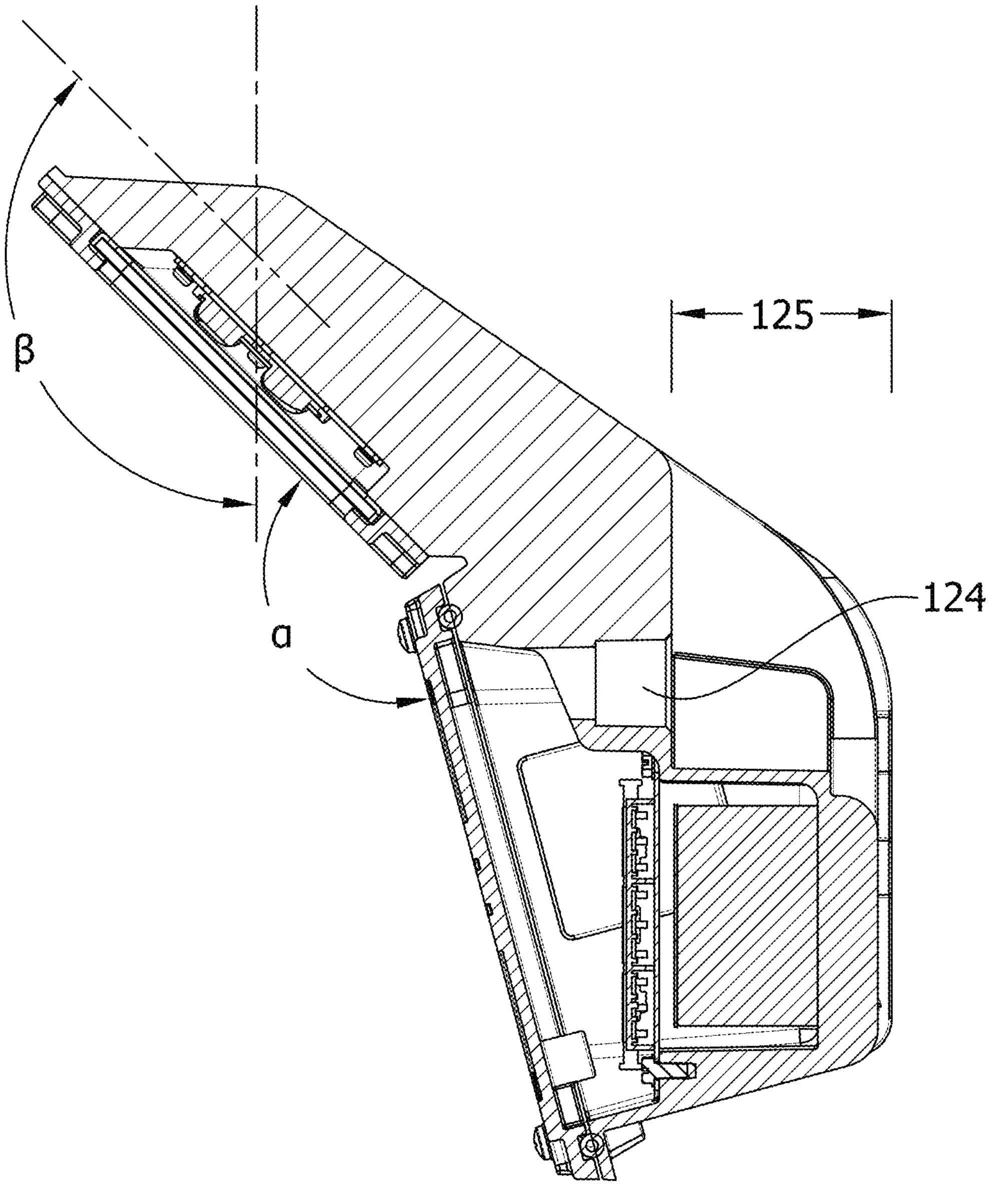
FIG. 12 is a cross-sectional view taken through the line 12-12 of the wallpack light fixture in FIG. 1.
Figure 21:
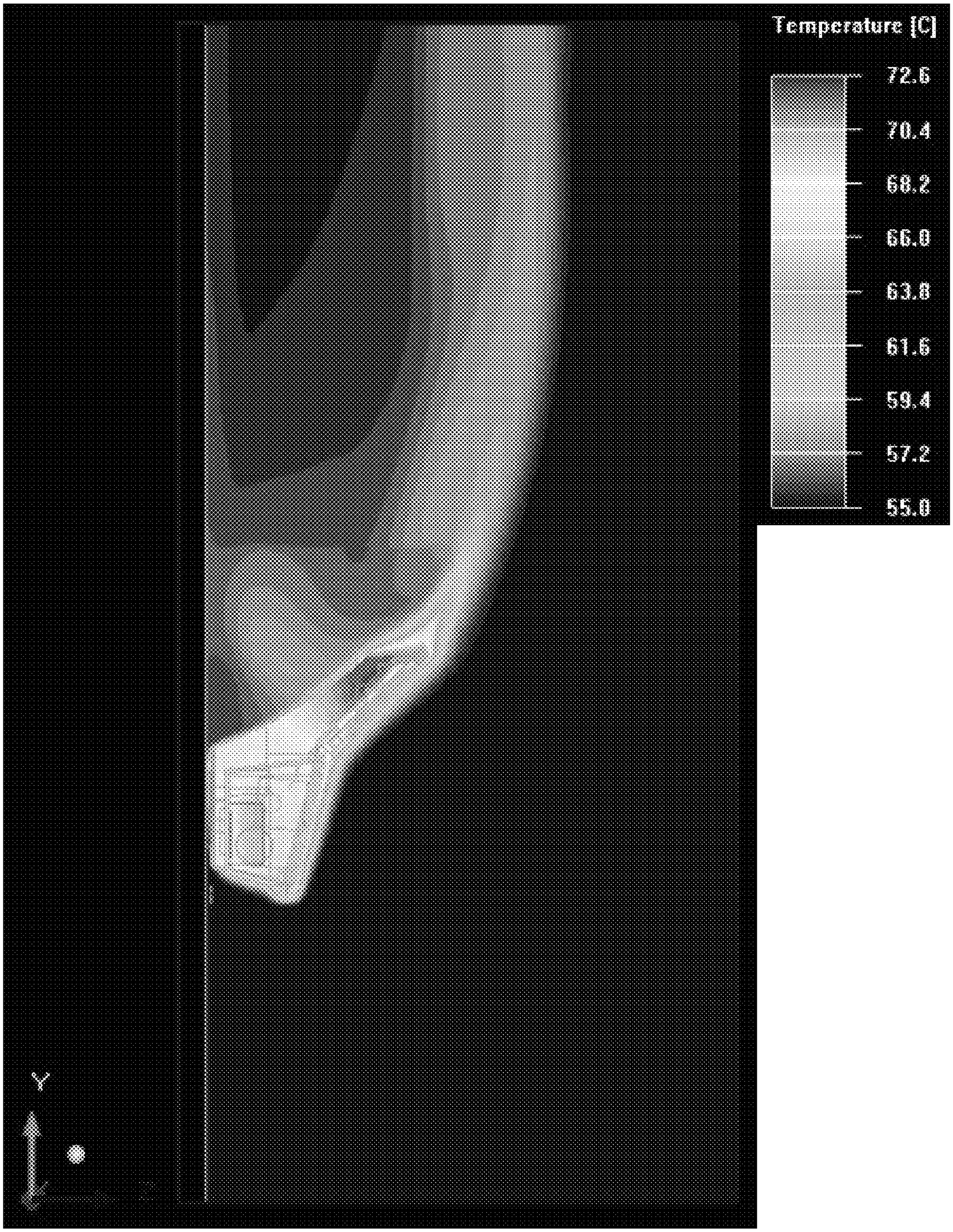
FIG. 21 is an image of the temperature distribution of the wallpack light fixture.
Figure 22:
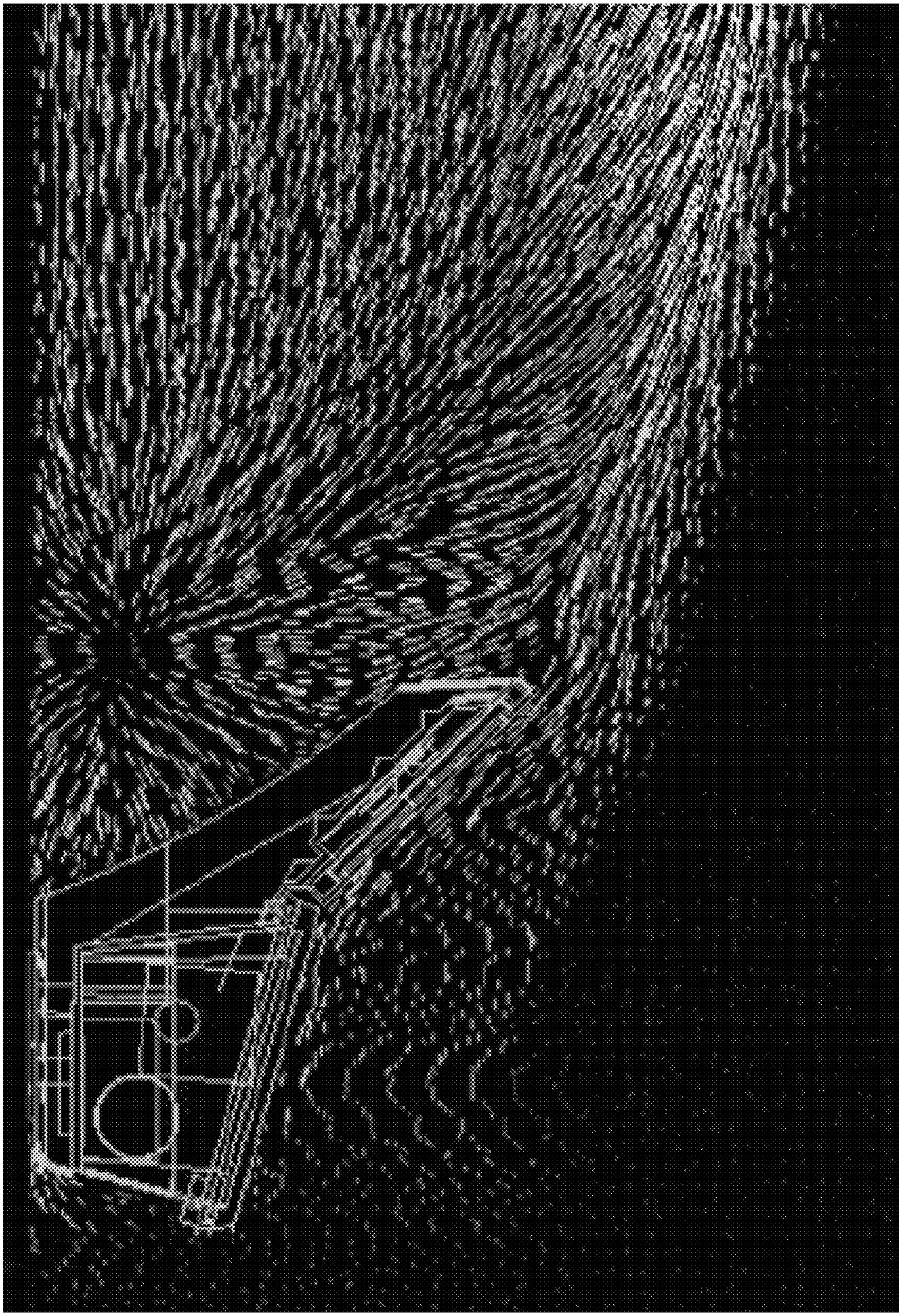
FIG. 22 is an image of the velocity streamlines of the wallpack light fixture.

Referring to FIG. 12, a front face of the illustrated first body portion 101*a* is disposed at an angle α less than 180° relative to a front face of the second body portion 101*b*. For example, the front face of the first body portion 101*a* is disposed at an angle α relative to the front of the second body portion 101*b* that measures from about 90° to 170°, or from about 100° to about 170°, or from about 110° to about 160°, or from about 120° to about 150°, or from about 130° to about 140°. The first body portion 101*a* is also disposed at an angle α less than 180° relative to a rear mounting face of the second body portion (e.g., relative to a wall to which the housing 101 is mounted. For example, the angle β may measure from about 90° to 170°, or from about 100° to about 170°, or from about 110° to about 160°, or from about 120° to about 150°, or from about 130° to about 140°. Through this configuration, light is directed in a downward angle. The angle β can create a gap between the first body portion 101*a* and a mounting surface, e.g., a wall. This gap can permit airflow between the fins 105 and the mounting surface, which allows for extraction heat from both the electronics assembly 104 and the light source while also allowing the light source to operate at a higher component temperature than the electronic assembly 104. The internal volume of the first body portion 101*a* typically generates more heat and is located and oriented such that it has unobstructed exposure allowing for thermal radiation. Convection velocity is substantially increased by this gap from the rear wall of the housing 101 which channels the airflow through the heat sink fins 105 and provides air velocity across the first body portion 101*a* generating the most heat. The increased heat generated in the first body portion 101*a* is depicted in FIG. 21. The ability of the wallpack light fixture to cool itself through the use of the heat sink fins 105 and the gap between the mounting surface and the rear wall of the first body portion 101*a* is depicted by the velocity streamlines of FIG. 22.

In the illustrated embodiment, the LED assembly 102 includes at least one light-emitting diode (LED) 102*a* mounted on a printed circuit board 103, for example. The printed circuit board 103 is preferably a metal core printed circuit board (MCPCB). Typically, the metal core comprises aluminum which allows for dissipation of heat away from the internal volume during operation of the light-emitting diodes 102. The LED-containing printed circuit board 103 can be affixed within the internal volume of the first body portion 101*a* via mounting screws 138, preferably MCPCB mounting screws. The wallpack light fixture also comprises optics 106*a* (e.g., lenses or reflectors) individually associated with and disposed over the LEDs 102*a* or other light source. In some embodiments, the optics 106*a* are omitted. A window pane (e.g., PC lens) 106*b* is disposed above the individual optics 106*a*. The optics 106*a* and the window pane 106*b* are substantially transparent, and typically comprise glass. In various embodiments, the optics 106*a* and the window pane 106*b* comprises a polycarbonate, high impact acrylic or safety glass, or other impact-resistant and heat-resistant material to allow its safe operation in hazardous and harsh conditions. The optics 106*a* can comprise a directional lens that allows for concentration of light output within a specific area.

The first body portion 101*a* of the housing 101 further comprises a gasket 107 adjacent to the optics 106*a* and the window pane 106*b*, and a bezel 108 adjacent to the gasket 107. The gasket 107 acts as a seal between the bezel 108 and the first body portion 101*a* of the housing 101. The bezel 108 serves to compress the gasket 107 against first body portion 101*a* of the housing 101 and seal the perimeter. The bezel 108, therefore, secures the optics 106*a* to the housing 101 and protects the LED-containing printed circuit board 103 or other light source from outside elements. The bezel 108 can be secured to the housing 101 via bezel screws 109. Thus, in a completed assembly, the optics 106 is positioned over the light source within the internal volume of the first body portion 101*a*, the bezel 108 is placed over the gasket 107, and the bezel 108 is attached to the housing 101 with bezel screws 109.

Figure 4:
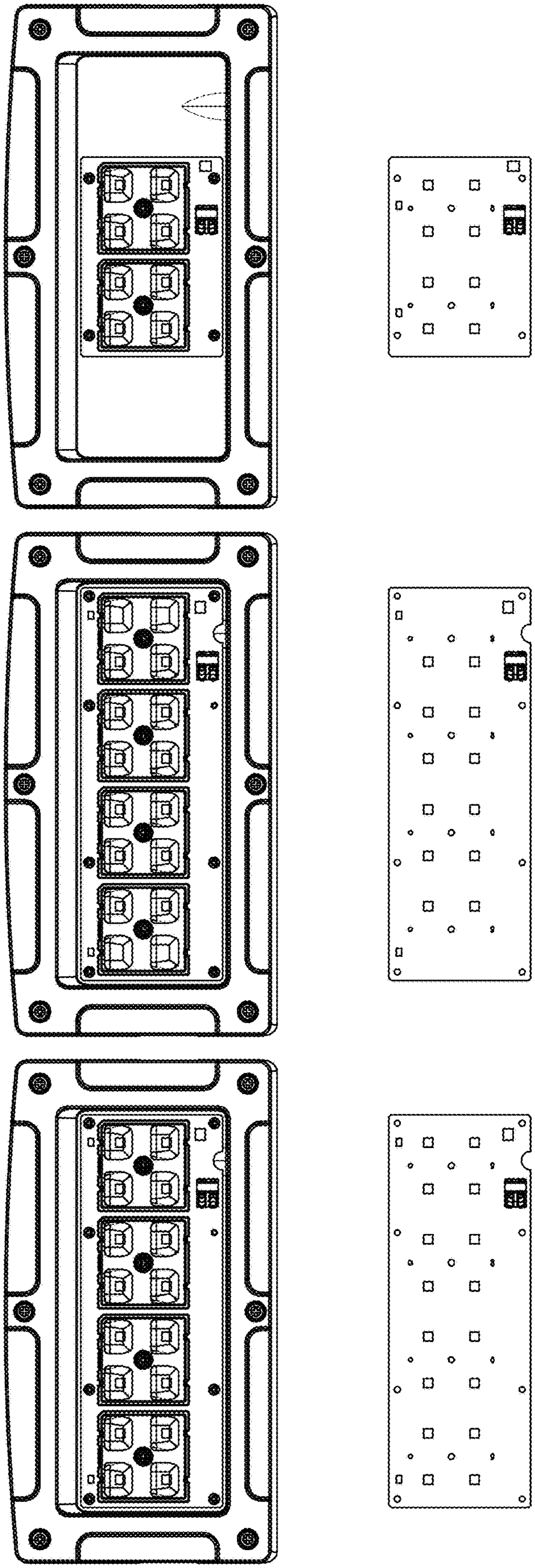
FIG. 4 includes front views of different configurations of the light assembly including different number of LEDs in the light assembly.

Referring to FIG. 4, the wallpack light fixture 100 generally has an output of at least about 3,000 lumens. For example, in some embodiments, the wallpack light fixture has an output of at least about 3,000 lumens, at least about 3,500 lumens, at least about 4,000 lumens, at least about 4,500 lumens, at least about 5,000 lumens, at least about 5,500 lumens, at least about 6,000 lumens, at least about 6,500 lumens, or at least about 7,000 lumens. In various embodiments, the wallpack light fixture 100 has an output of about 3,000 lumens, about 4,000 lumens, about 5,000 lumens, about 6,000 lumens, or about 7,000 lumens. In various embodiments, the lumen output can vary from about 3,000 lumens to about 7,000 lumens.

When LEDs are utilized, the desired lumen output generally dictates how many light-emitting diodes 102 should be present on the printed circuit board 103. Thus, it will be understood by the skilled person that the number of LEDs can be adjusted based on the desired amount of light, and that the LEDs can also be arranged in one or more rows.

Figure 5:
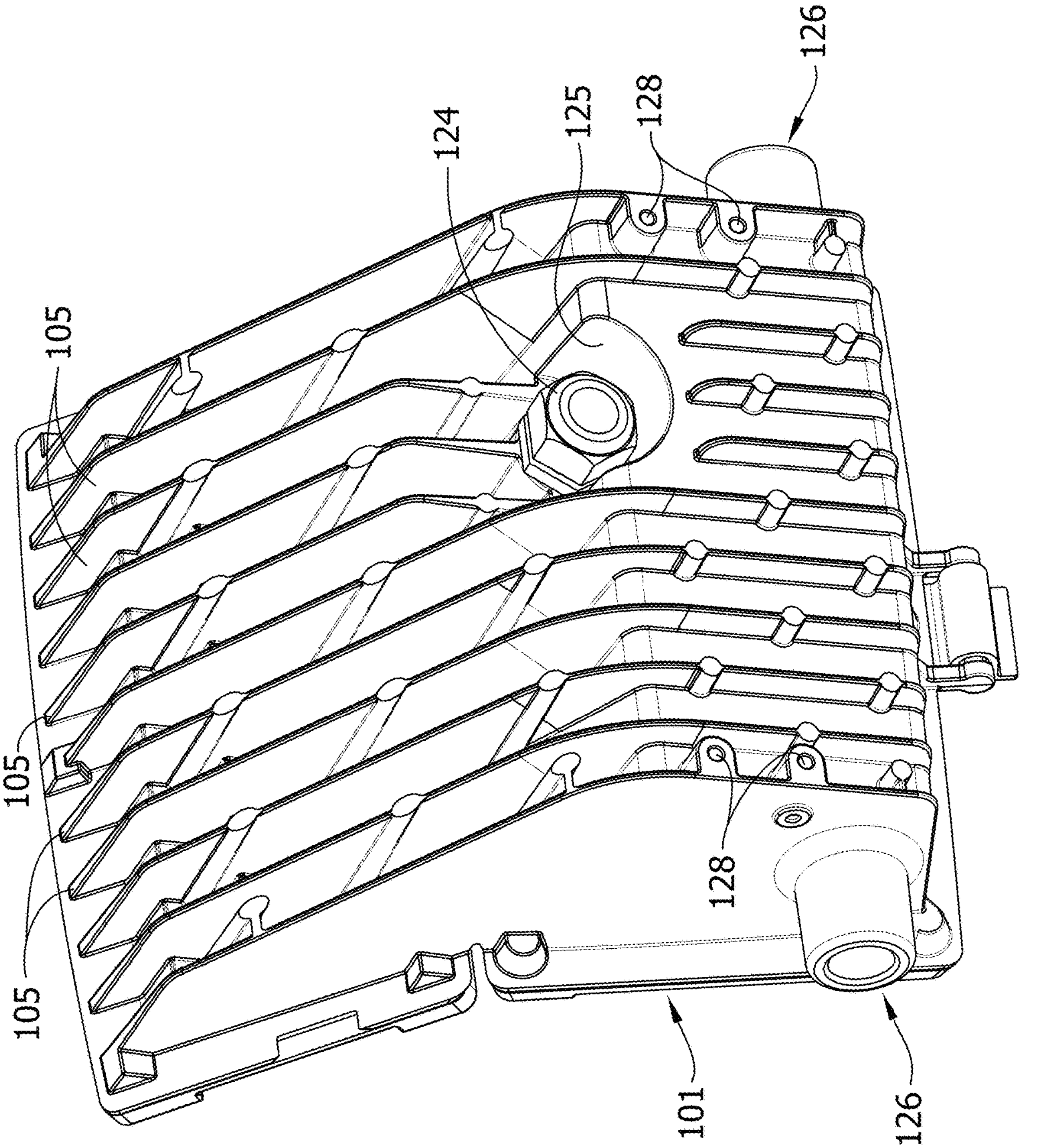
FIG. 5 is a rear perspective view of the wallpack light fixture.

Generally, it is desirable to be able to use a single housing 101 to accommodate the different lighting outputs. Thus, in a preferable embodiment, the printed circuit boards 103 of various lumen outputs have holes that allow securing the printed circuit board 103 to the housing 101 via the mounting screws 138 in the same location, allowing for a single configuration of the housing 101. Nonetheless, the housing 101 can also be made in any shape or size in order to accommodate the required number of LEDs 102. Referring to FIG. 5, the wallpack light fixture 100 further comprises a plurality of heat sink fins 105 on the exterior of the housing 101. The heat sink fins 105 enhance the dissipation of heat generated by the light-emitting diodes 102 and any other electronic components that produce heat (e.g., power supply, driver, etc.) to the ambient air. In this way, the heat sink fins 105 prevent the wallpack light fixture 100 from overheating when in operation. Like the housing 101, the heat sink fins 105 can be fabricated from a thermally conductive material, such as a metal, metal alloy, or thermally conductive plastic or polymer material. In various embodiments, the metal comprises aluminum. Preferably, the heat sink fins 105 are fabricated from the same material as the housing 101. More preferably, the heat sink fins 105 and the housing 101 are both fabricated from aluminum and constitute a single molded, cast, or machined piece. The shape and size of the heat sink fins 105 can vary based on the size of the housing 101 and the number of light sources. For example, more heat sink fins 105 may be needed for an apparatus having more light sources due to the increased heat generated. The heat sink fins 105 are generally on the opposing side of the housing 101 as the light source. In a typical embodiment, the LED-containing printed circuit board 103 is mounted to the interior rear of the first body portion 101*a* of the housing 101, and the heat sink fins 105 are placed on the exterior rear of the housing 101, directly opposed to the printed circuit board 103. The heat sink fins 105 can be substantially continuous over the rear exterior of the housing 101.

Figure 6:
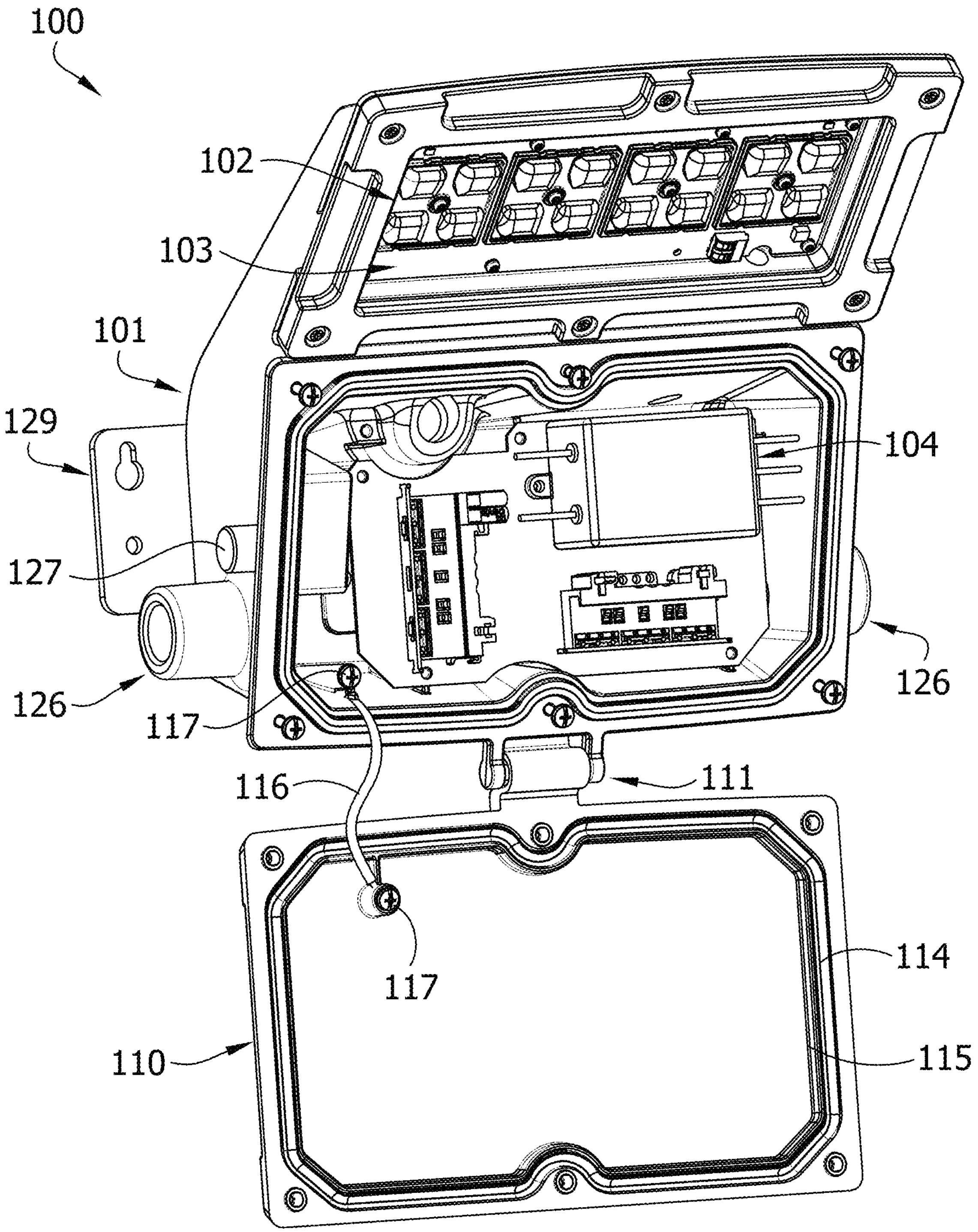
FIG. 6 is a perspective view of the wallpack light fixture with a door in the open position.
Figure 7:
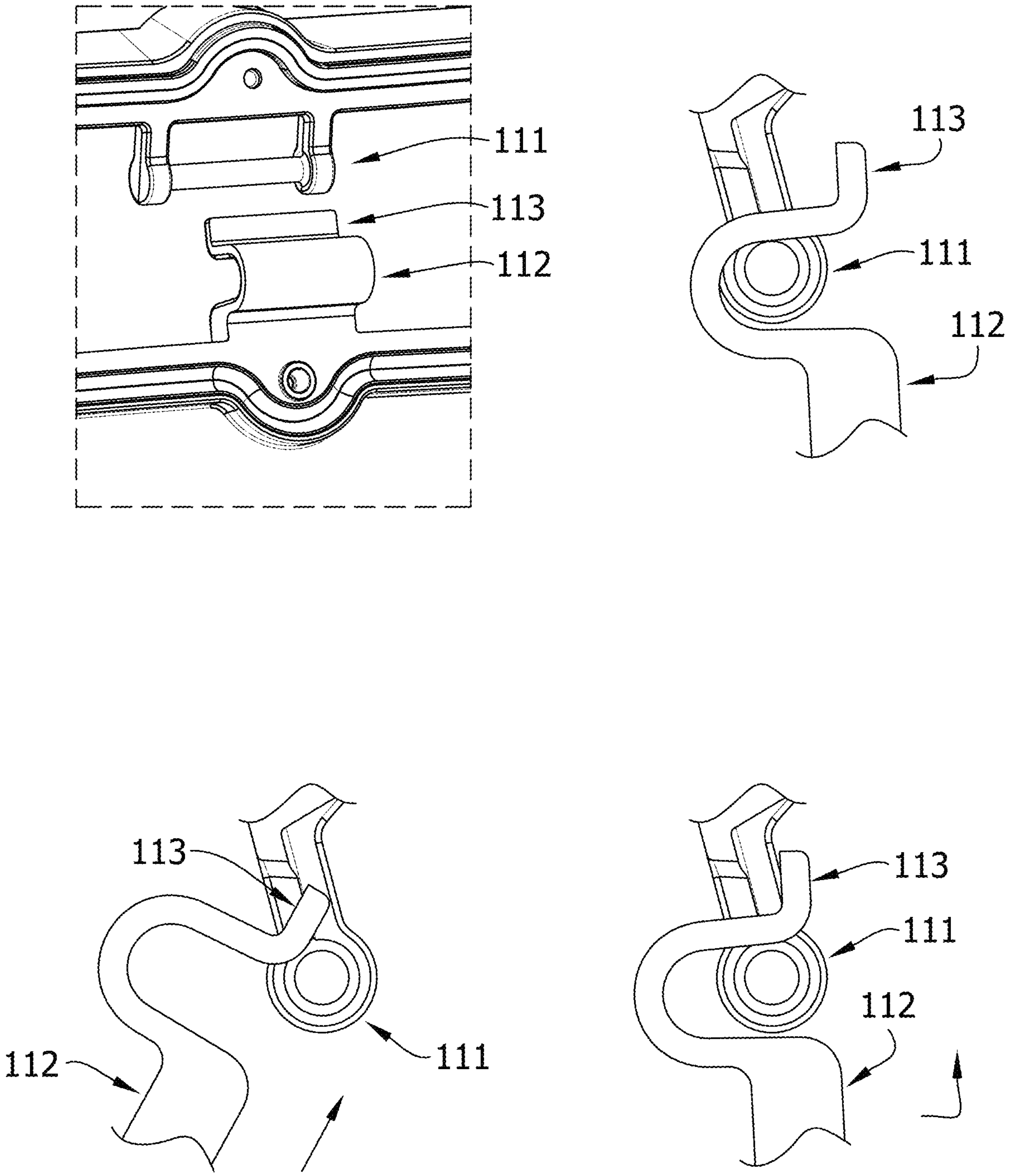
FIG. 7 includes different views of the pivotally door mechanism.
Figure 8:
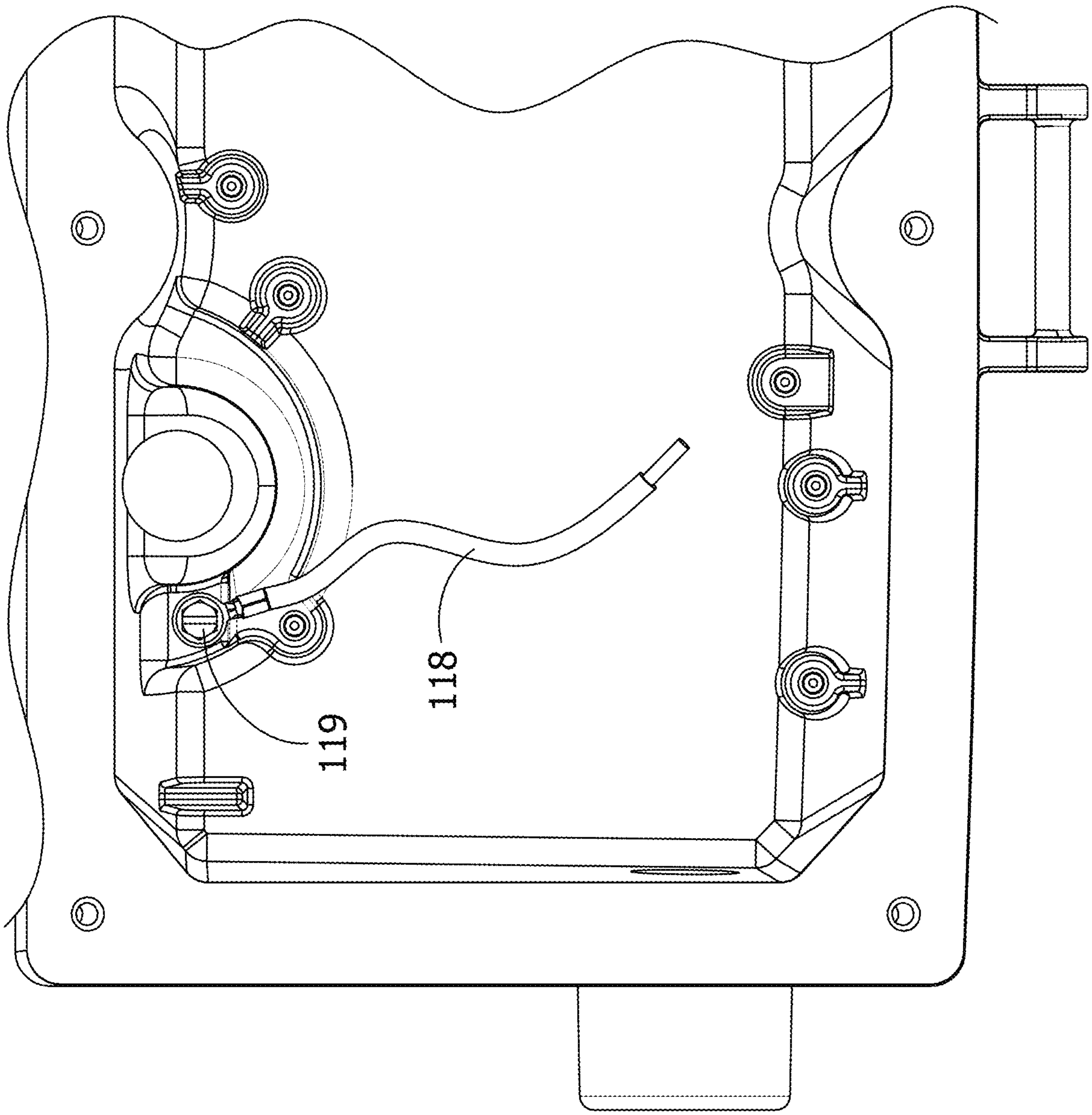
FIG. 8 is a perspective view of the grounding conductor and screw in the interior of the housing.

Referring to FIGS. 6 and 7, the wallpack light fixture 100 can also comprise a pivotally attached door 110 disposed on the second body portion 101*b* of the housing 101. Generally, the pivotally attached door 110 is located on the opposite side of the housing 101 as the heat sink fins 105. This door 110 is hinged to the housing 101 in order to allow access to the interior of the housing 101. Thus, a hinge bracket 111 can be mounted to the bottom of the housing 101 and the door 110 can be attached to the hinge bracket 111 via a swinging mount 112. In some embodiments, the door comprises a flange 113 that is able to interlock with the hinge 111 mounted to the bottom of the housing 101. In this way, the flange 113 can be inserted into the hinge 111 to allow for locking of the door 110 in an open position to allow for easy access to the interior. The door 110 can be manually removed from the hinge bracket 111 without the use of tools or fasteners. In various embodiments, an O-ring 114 is adhered to the interior of the door 110, and preferably fits within a groove 115 in the door 110. For example, the O-ring 114 can be glued so that it fits within the groove 115 of the door 110. A grounding conductor 116 can be run between the door 110 and the housing 101 so that it connects the door 110 and the housing 101. Groundings screws 117 can be located on both the interior of the housing 101 and the door 110. Thus, even when the door 110 is in an open position, the hinge operates in such a manner so as to allow the grounding conductor 116 to remain connected to both the housing 101 and the door 110. A grounding conductor 118 and screw 119 can also be placed in the internal volume of the second body portion 101*b* so that any wires connected therein can be properly grounded, as shown in FIG. 8.

Figure 9:
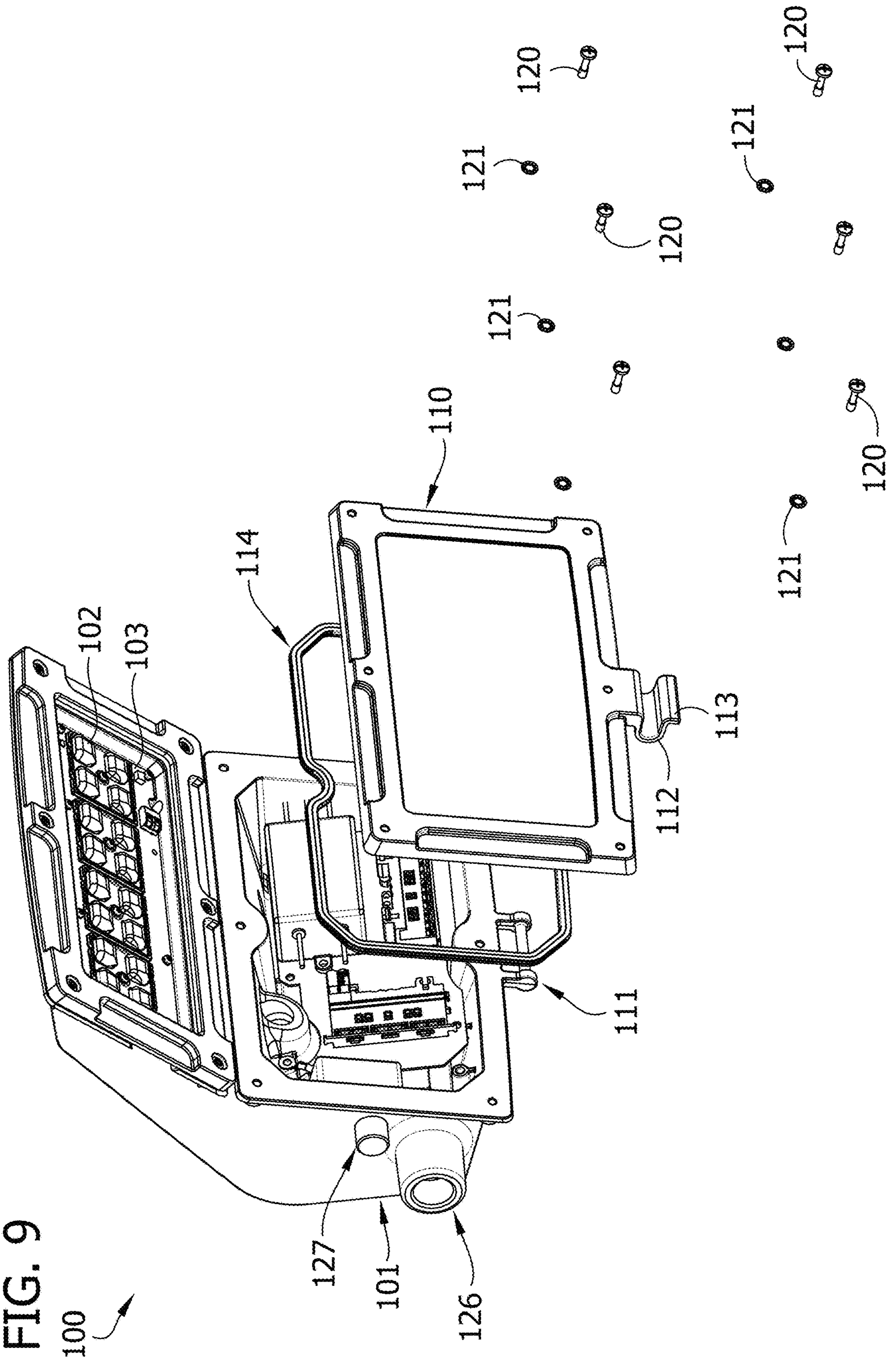
FIG. 9 is an exploded view of the pivotally attached door on the wallpack light fixture.
Figure 10:
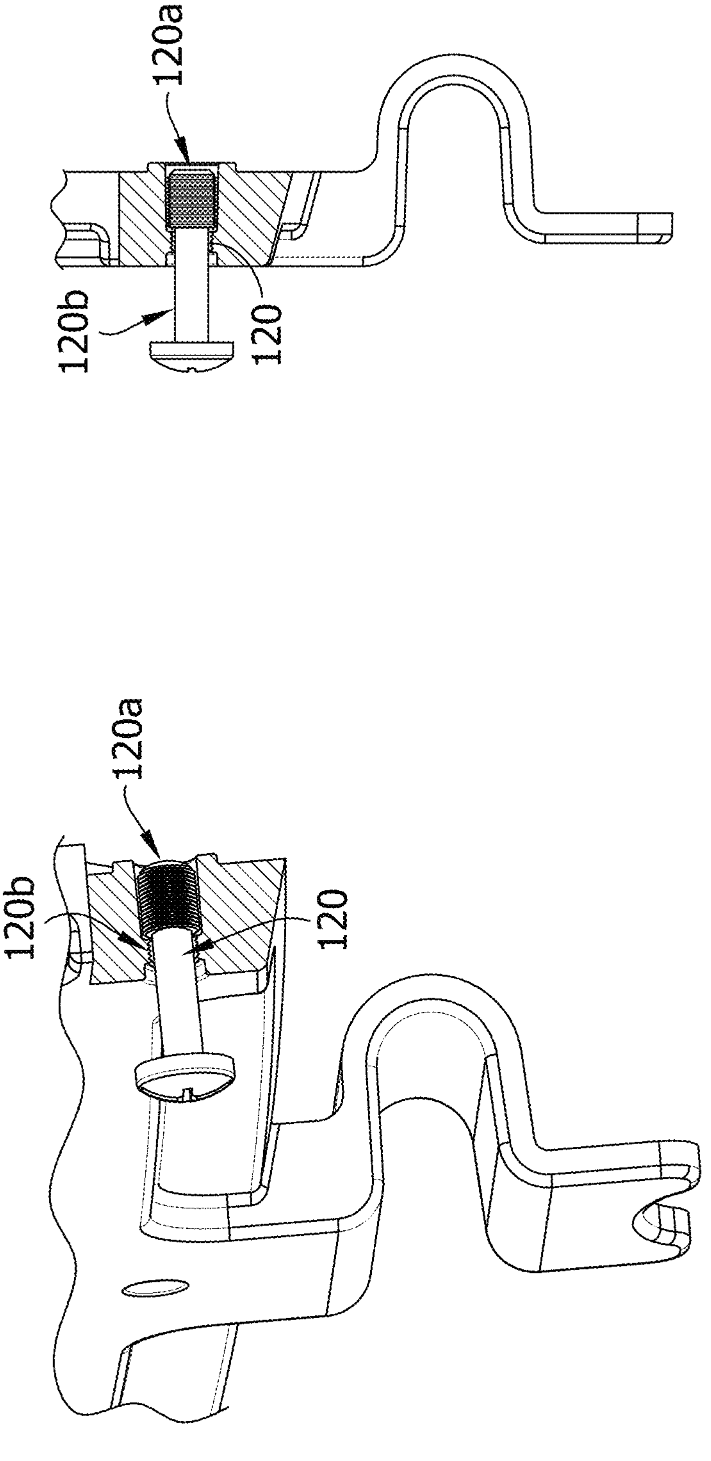
FIG. 10 includes views of the captive screws within the door of the wallpack light fixture.

Referring to FIGS. 9 and 10, when in a closed position, the door 110 can be retained in place via one or more screws 120. In a preferred embodiment, the screws 120 comprise captive screws which comprise a threaded collar 120*a* with a non-threaded top portion 120*b*. The threaded collar 120*a* allows for the screws 120 to be retained in the door 110 even when disengaged from the housing 101. This allows for easy access to the interior of the housing 101 without the need to handle loose screws while also providing a secured door 110 when in the closed position. Further, washers 121 can be placed between the screws 120 and the door 110.

Figure 11:
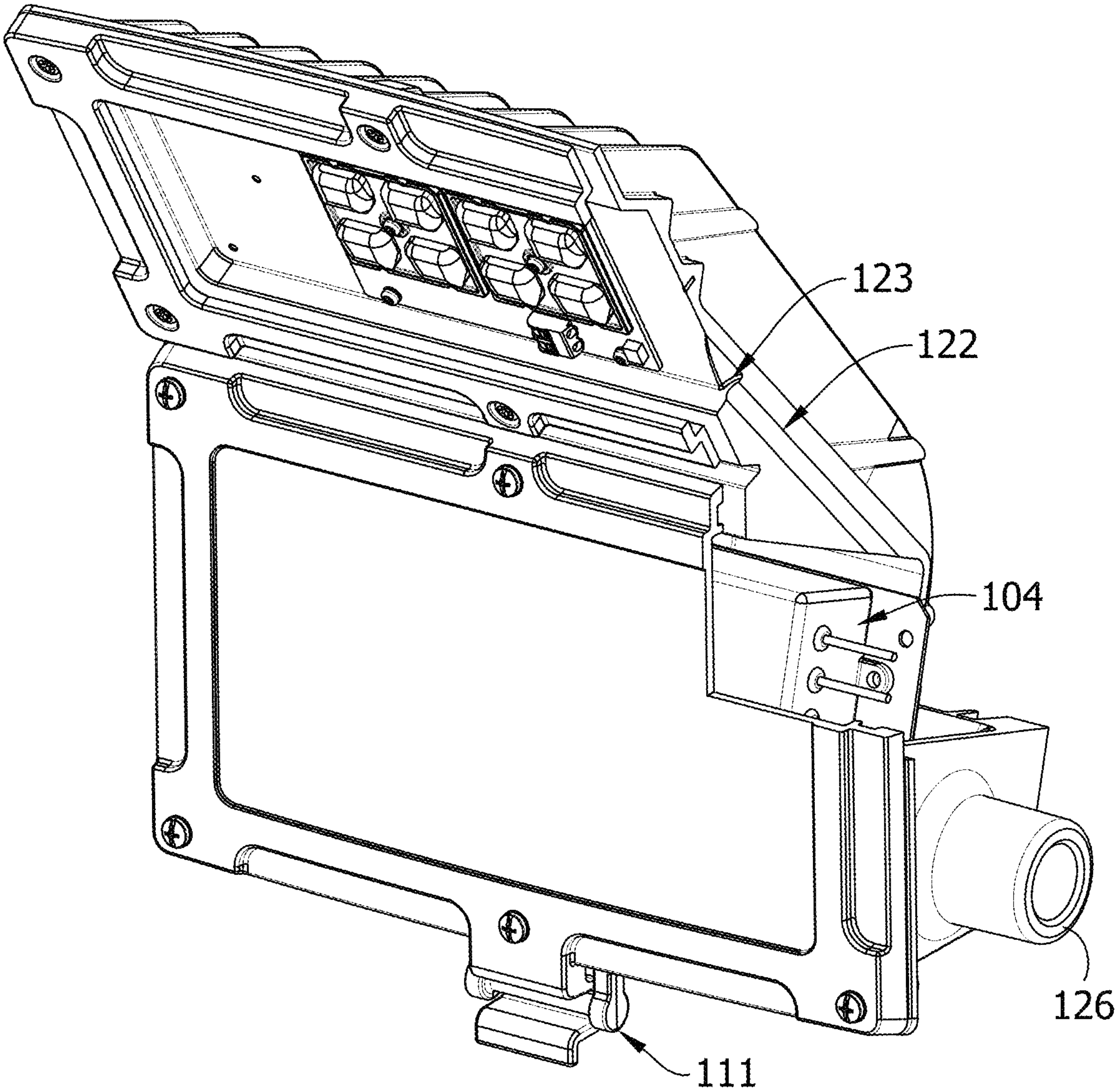
FIG. 11 is a partial cross-sectional perspective view of the wallpack light fixture.

Referring to FIG. 11, in various embodiments, the wallpack light fixture 100 further comprises a raceway 122 connecting the first body portion 101*a* to the second body portion 101*b*. The raceway 122 therefore provides a pathway for electrical connection of the power supply, such as the driver 104, to the printed circuit board 103, while also protecting any electrical wiring 123. When the housing 101 is constructed via cast material, the raceway 122 can be formed by drilling the cast housing 101. Alternatively, when the housing 101 is machined, the raceway 122 can also be machined. When a gravity cast, permanent mold, sandcast, or other form of creating the housing 101 is used, the raceway 122 can be cast or molded in. A separate liner can also run the full length or a portion of the raceway 122 to protect the electrical wiring 123 from damage during installation and operation.

Referring to FIGS. 5 and 12, the wallpack light fixture 100 can further comprise a rear conduit entry 124 located on the rear of the housing 101, extending from the exterior rear wall to the internal volume of the second body portion 101*b*. The recess 125 is defined by the rear exterior of the housing 101. The rear conduit entry 124 extends to the recess 125. The recess 125 allows for clearance between any cable gland or other attachment and the mounting surface in order to allow for wire bend and easy access. The housing 101 can further comprise at least one side conduit entry 126 (for example, two side conduit entries 126) extending from the exterior of each of the side walls to the internal volume of the second body portion 101*b*. These side conduit entries 126 can be substantially perpendicular to the rear conduit entry 124 and allow for feed-through wiring. The side conduit entries 126 can also be substantially aligned to be used as a pivot point for mounting the housing 101 to a surface, such as a wall. The side conduit entries 126 can be used to mount the housing 101 to a surface, such as a wall.

Figure 3:
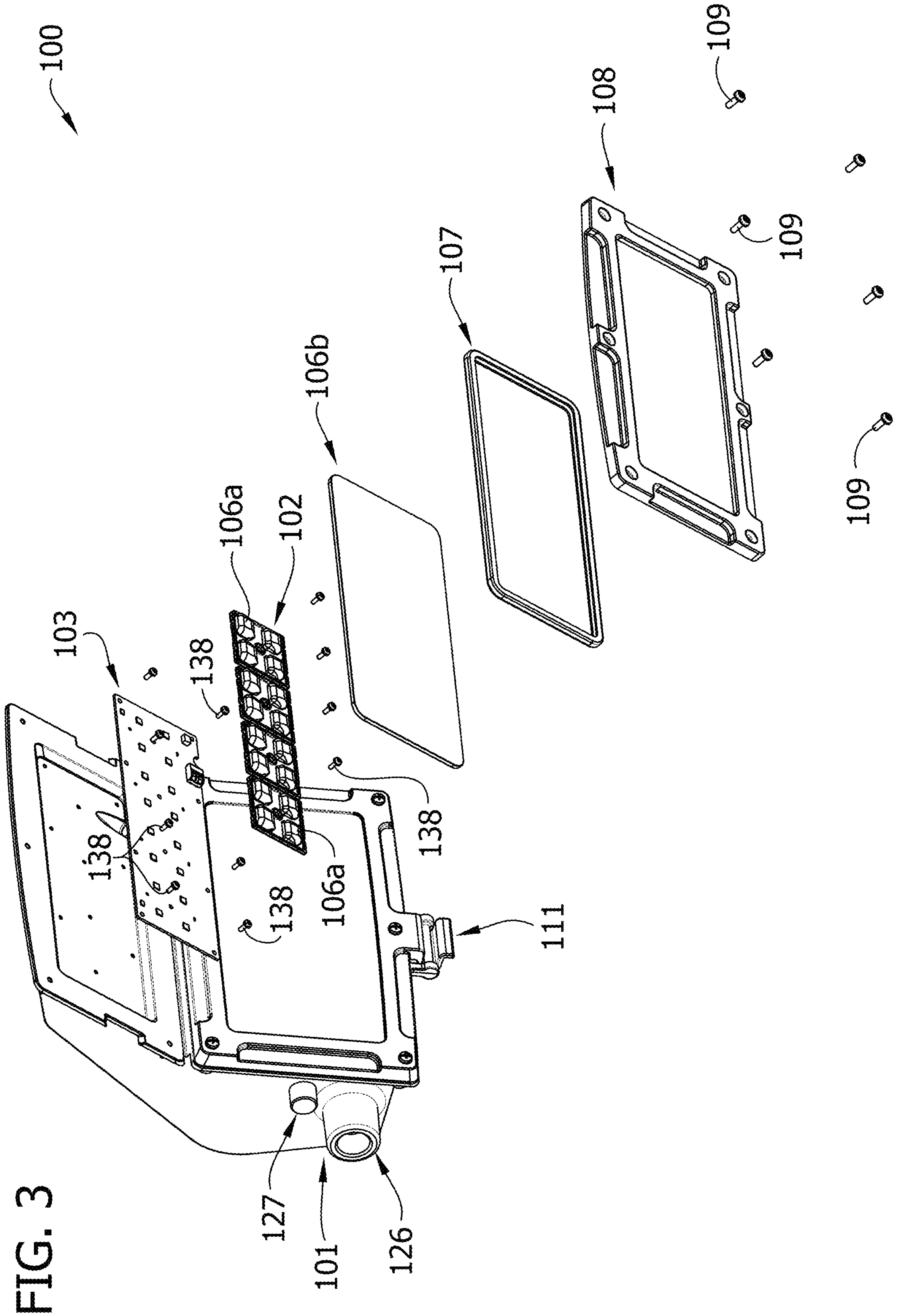
FIG. 3 is an exploded view of a light assembly including light emitting diodes (LEDs), a printed circuit board, and a lens assembly within the light fixture.

In various embodiments, and as depicted in FIG. 3, the wallpack light fixture 100 can also comprise a photocell 127. The photocell 127 is able to detect ambient light via changing electrical currents. In this way, when the environment surrounding the apparatus 100 is dark, the photocell 127 is capable of triggering the wallpack light fixture 100 to turn on and emit light. When the surrounding environment becomes bright, the photocell 127 is capable of triggering the wallpack light fixture 100 to turn off or to dim to a level less than full power.

Figure 13:
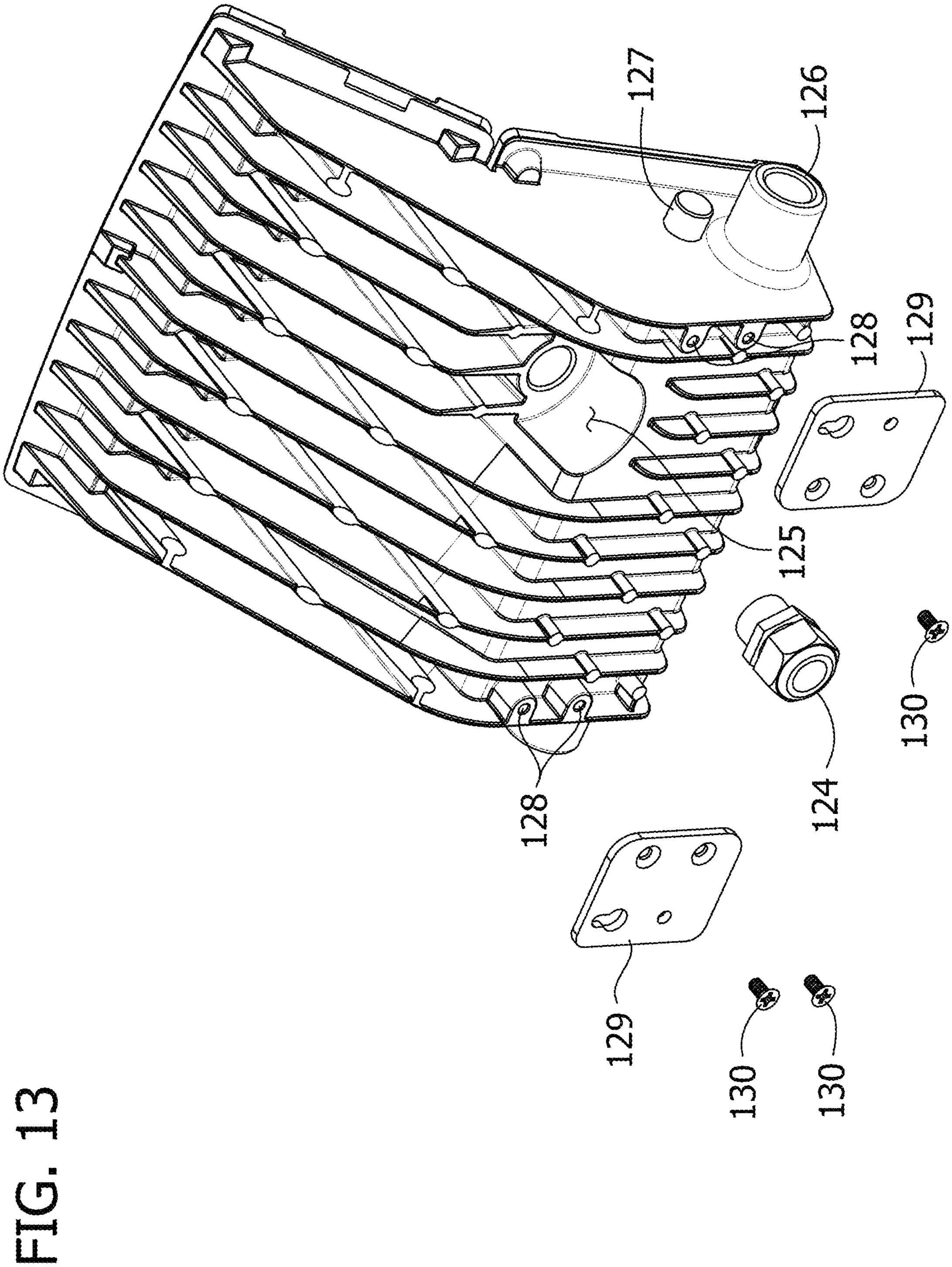
FIG. 13 is a perspective view of the rear with mounting features exploded from the wallpack light fixture.

Referring to FIG. 13, the wallpack light fixture 100 can further comprise at least one mounting boss 128 disposed on the rear of the housing 101. The mounting bosses 128 allow for attachment of at least one bracket 129 so that the LED wallpack light fixture 100 can be mounted to, for example, a wall. The bracket 129 can be attached to the housing 101 with screws 130 placed into the mounting bosses 128.

Figure 14:
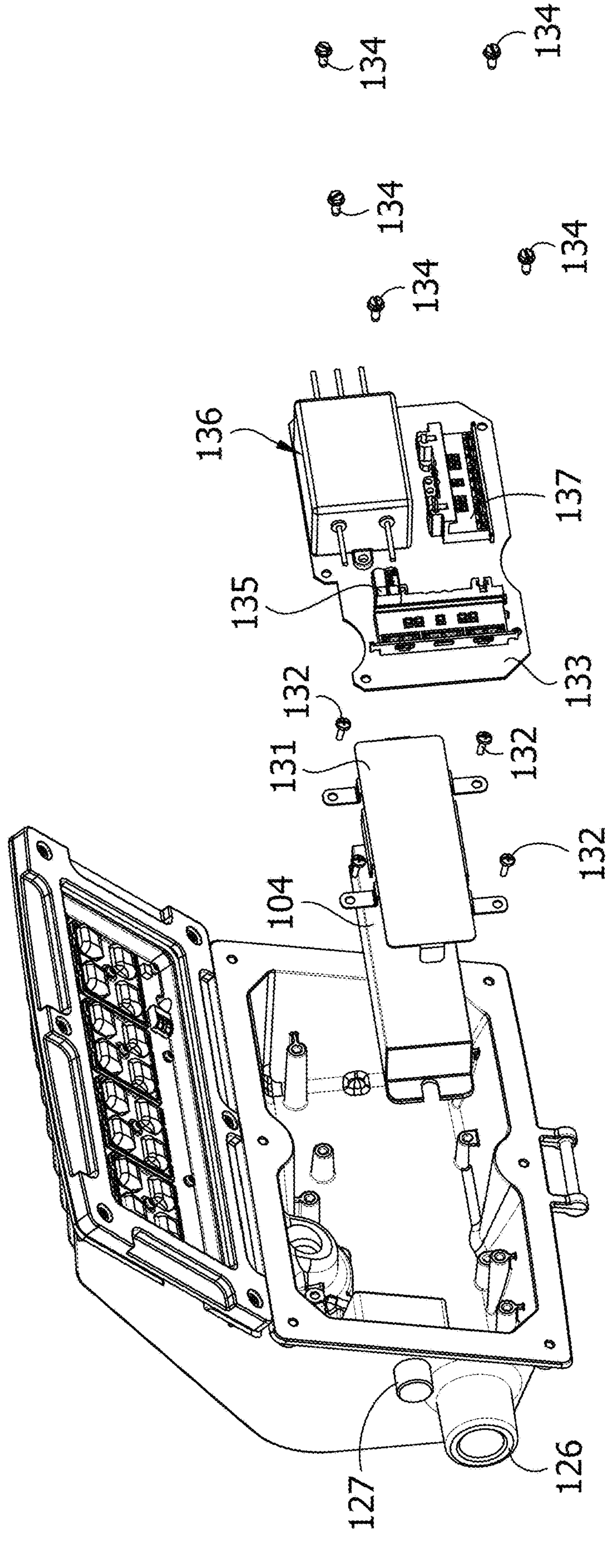
FIG. 14 is an exploded view of the driver, driver bracket mount, and terminal bracket mount within the wallpack light fixture.
Figure 15:
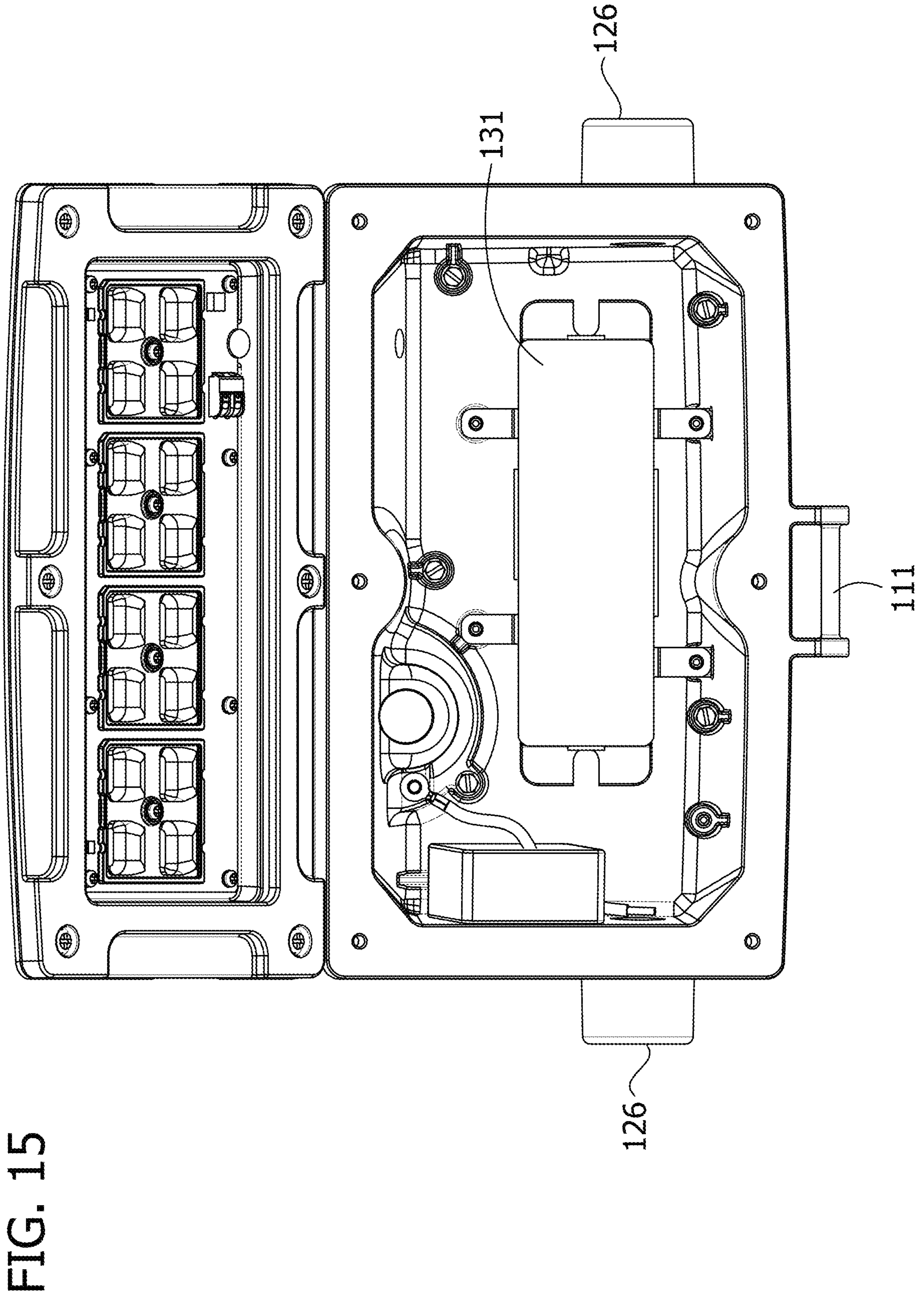
FIG. 15 is a front view of the wallpack light fixture with the door removed to show the driver bracket mount.
Figure 16:
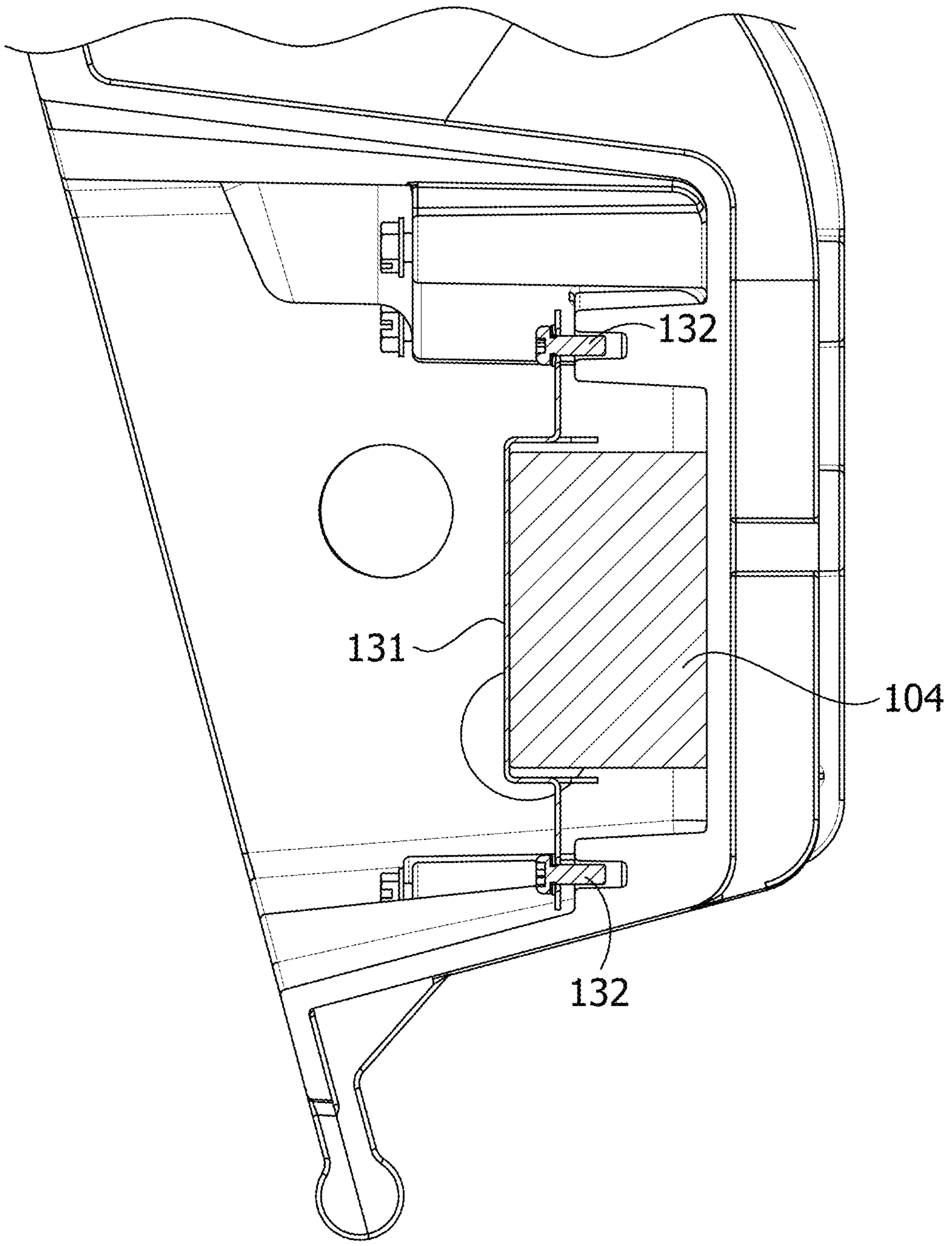
FIG. 16 is an enlarged, fragmentary cross-sectional view of the wallpack light fixture depicting the driver and driver bracket mount.
Figure 17:
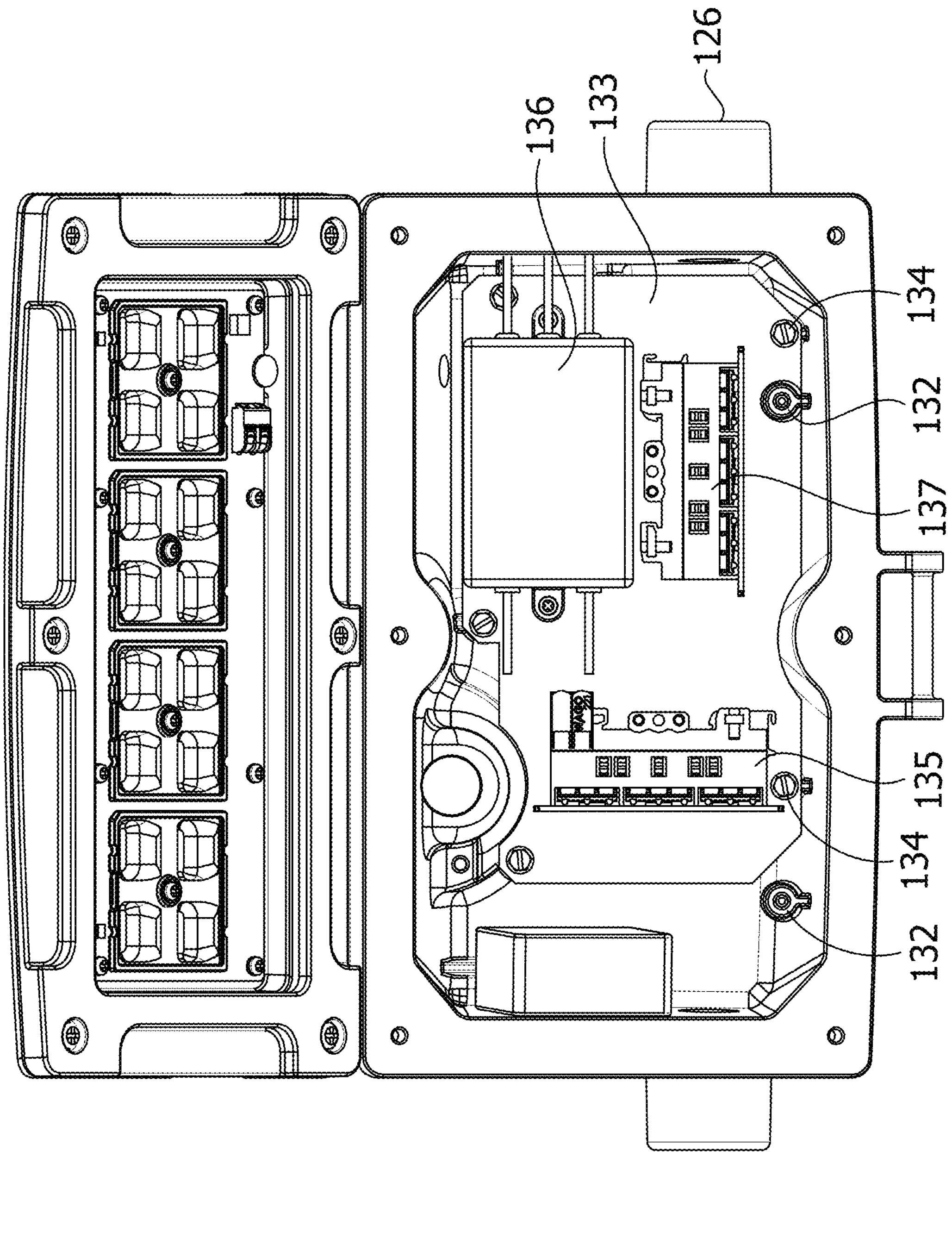
FIG. 17 is a front view of the wallpack light fixture with the door removed showing the terminal bracket mount and electronics.

In the wallpack light fixture of the present disclosure, such as depicted in FIGS. 14-16, the driver 104 is disposed in the internal volume of the second body portion 101*b*. Generally, the driver 104 can be mounted to the rear wall of the internal volume of the second body portion 101*b* via a driver bracket mount 131 placed over the driver 104 and secured to the rear wall with driver mounting screws 132 in mounting holes 139.

In some embodiments, a terminal bracket mount 133 can be mounted over the driver bracket mount 131 in order to allow for a stacking arrangement (i.e., the terminal bracket mount 133 overlies the driver bracket mount 131). The terminal bracket mount 133 can be coupled to the housing 101 with screws 134. The terminal bracket mount 133 can contain a number of features, including a terminal block 135, a surge protector 136, a mounting carrier 137, or any other combination of features or electronic devices required to allow functioning of the light-emitting diodes 102. The terminal bracket mount 133 can be assembled separately and installed later in the housing 101.

Figure 18:
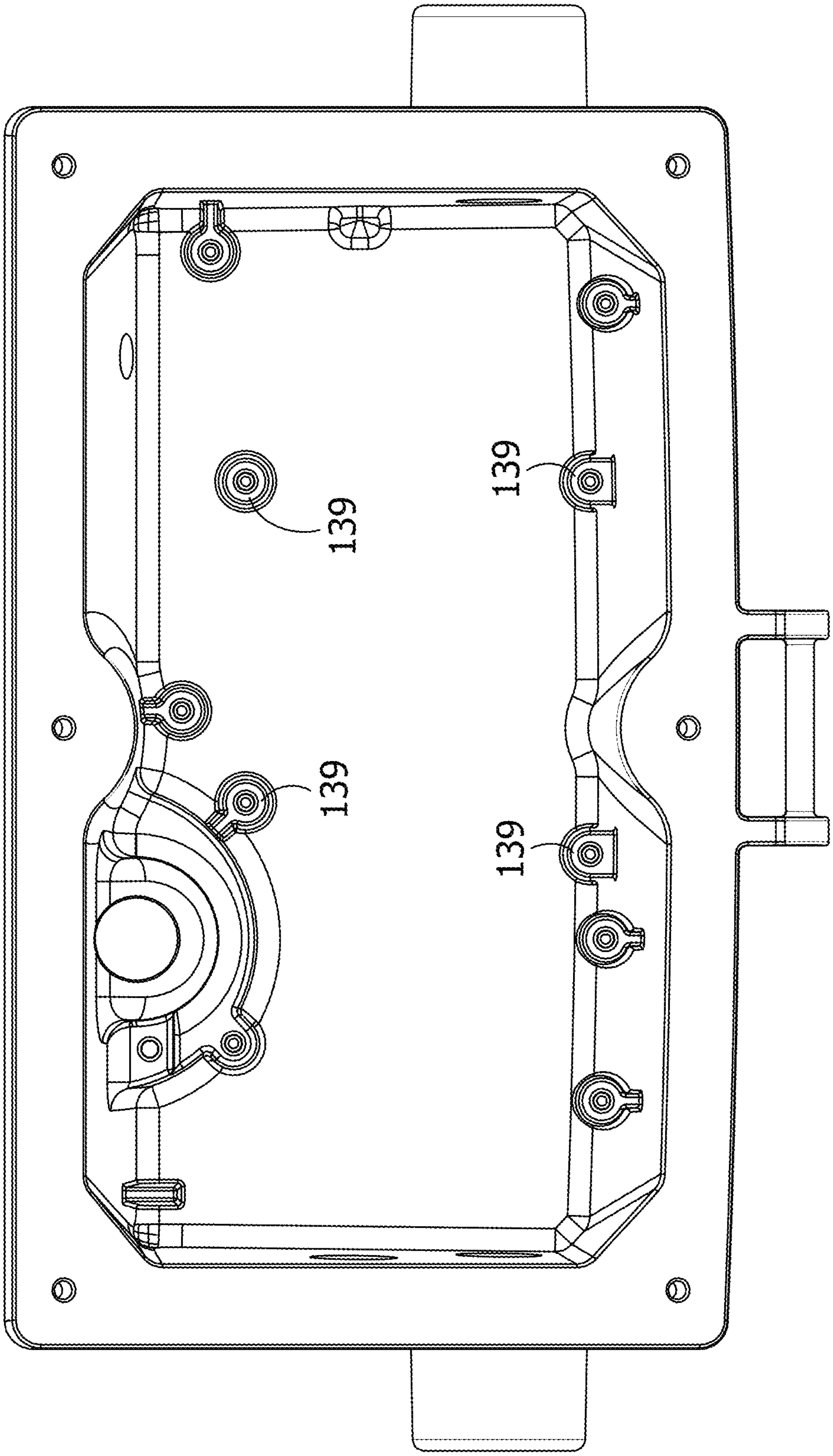
FIG. 18 is an interior front view of the wallpack light fixture depicting mounting holes.

The skilled person will understand that different drivers and brackets can be used according to the desired input voltage, including alternating and direct current options. In various embodiments, two different driver mounting brackets can be used to hold different driver variants (i.e., depending on whether the bracket is required to sustain high or low voltage). However, as shown in FIG. 18, in order to increase ease of use, the mounting holes 139 for the brackets will have the same pattern in order to allow for a single configuration of the housing 101. In further embodiments, the mounting holes 139 can be asymmetrically placed in order to avoid improper insertion of the bracket.

In some embodiments, compression stoppers (not shown) can be provided at each location where a screw can be placed in order to reduce the area of contact. The compression stopper generally comprises a raised area surrounding the screw hole.

Figure 19:
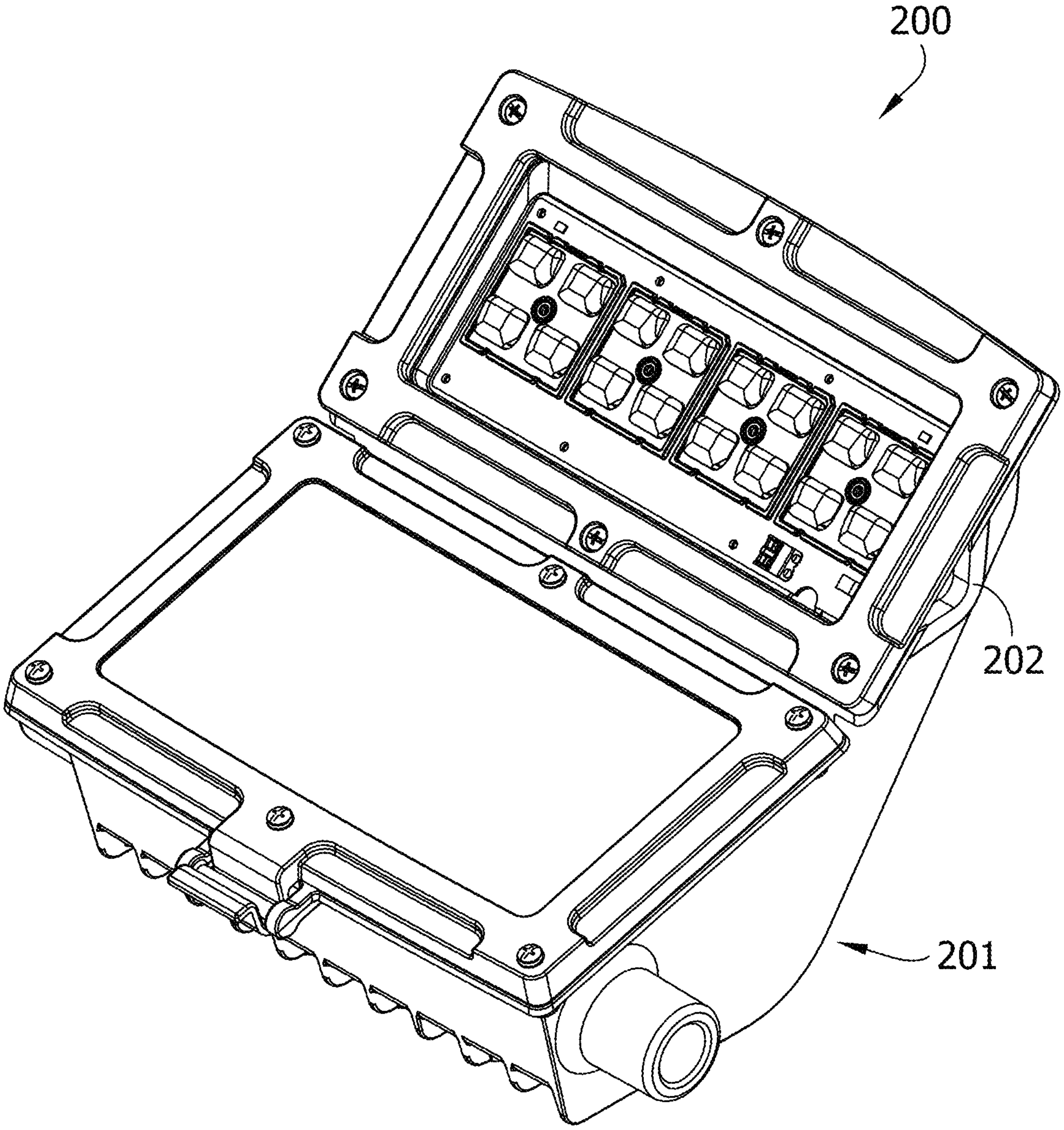
FIG. 19 is a perspective of another embodiment of the wallpack light fixture.
Figure 20:
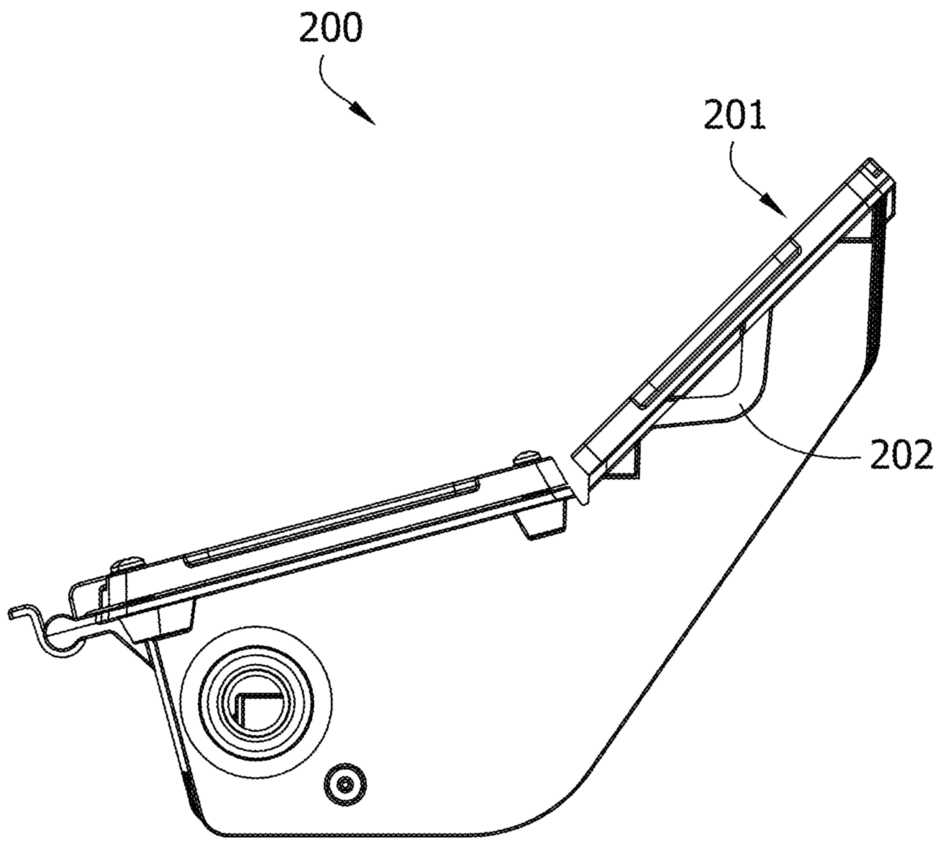
FIG. 20 is a side view of the wallpack light fixture of FIG. 19.

Referring to FIGS. 19 and 20, another embodiment of the wallpack light fixture is generally indicated at 200. This wallpack light fixture 200 is substantially identical to the previous embodiment except that the present wallpack light fixture includes attachments 202 (e.g., hoops) extending outward from a rear of the housing 201. The attachments 202 are configured to receive hooks or carabineers or other attachment mechanism for securement to the attachments 202. In this way, one or more wires or other tether attached to the hooks or carabineers can be anchored to a wall to provide a back-up in case the brackets 129 fail.

Figure 23:
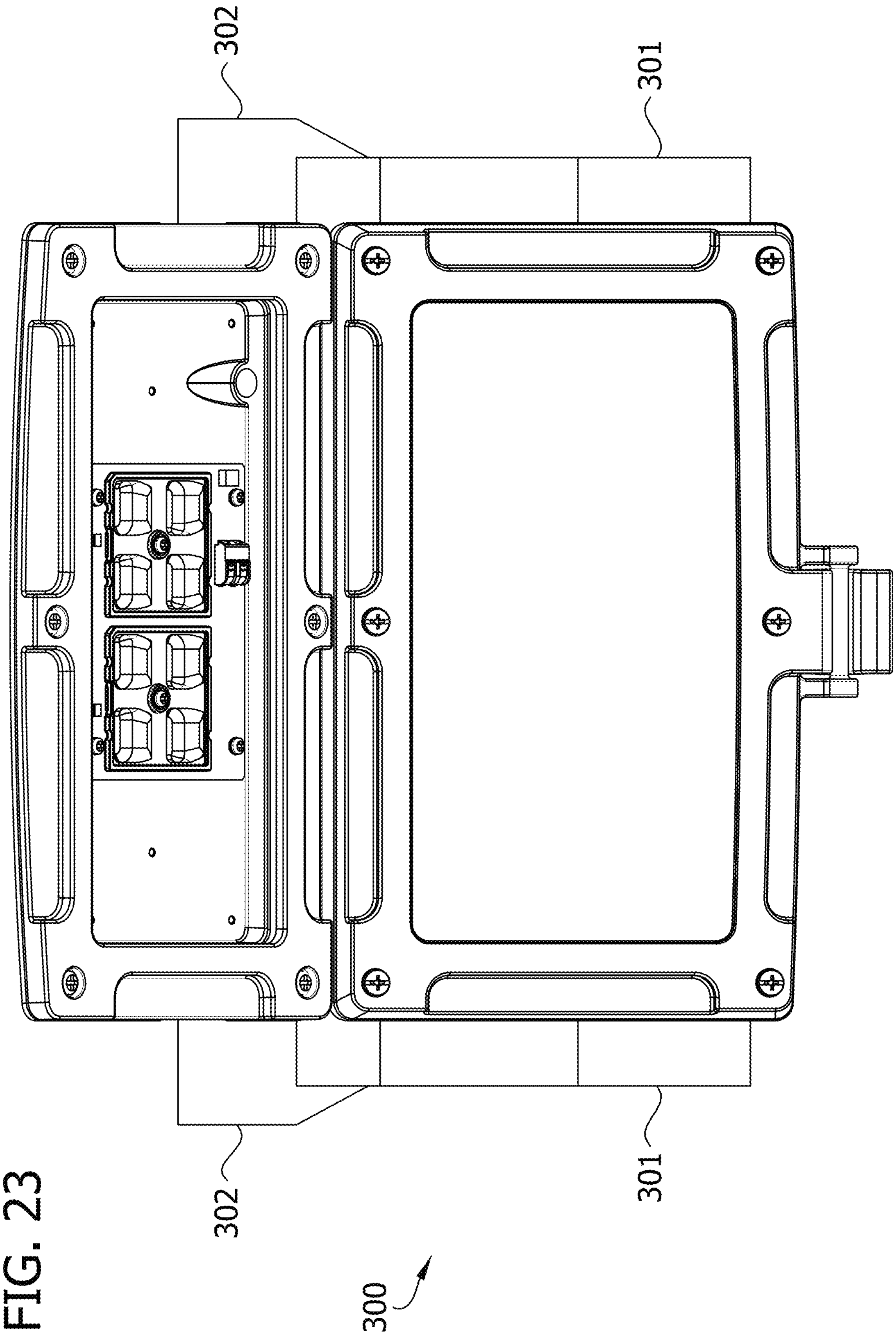
FIG. 23 is a front view of the wallpack light fixture with side conduit entry mounting members.
Figure 24:
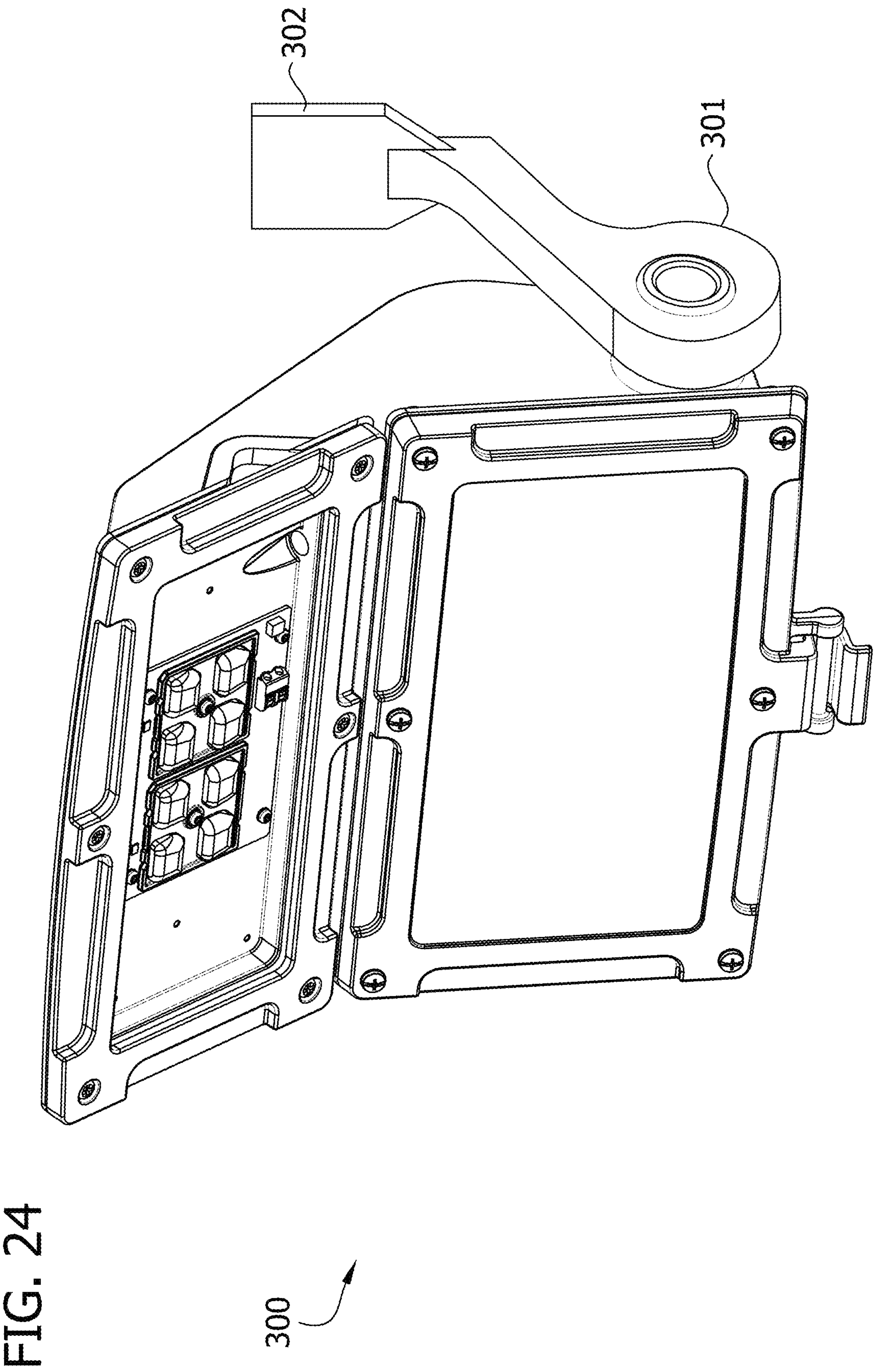
FIG. 24 is a perspective view of the wallpack light fixture with side conduit entry mounting members.

Referring to FIGS. 23 and 24, another embodiment of the wallpack light fixture is generally indicated at 300. The wallpack light fixture 300 is substantially identical to the previous embodiment except that the present wallpack light fixture includes side conduit mounting members 301. The side conduit mounting members 301 are coupled to the at least one side conduit entry 126 (for example, at least two side conduit entries 126). The side conduit mounting member 301 extends toward a mounting surface (e.g., a wall). The terminal end of the side conduit mounting member 301 includes a flat surface 302 to facilitate mounting of the wallpack light fixture 300.

EMBODIMENTS

For further illustration, additional non-limiting embodiments of the present disclosure are set forth below.

For example, embodiment 1 is a wallpack light fixture, comprising a housing having two adjacent body portions each defining an internal volume; at least one light source mounted within the internal volume of the first body portion; a power supply disposed in the internal volume of the second body portion; and a plurality of heat sink fins on the exterior side of the housing.

Embodiment 2 is a wallpack light fixture comprising a housing having two adjacent body portions each defining an internal volume; at least one light source mounted within the internal volume of the first body portion; a power supply disposed in the internal volume of the second body portion; and a door pivotally attached the second body portion.

Embodiment 3 is a wallpack light fixture comprising a housing having two adjacent body portions each defining an internal volume; at least one light source mounted within the internal volume of the first body portion; a power supply disposed in the internal volume of the second body portion; and a raceway disposed between the first and second body portions to connect the power supply to the light source.

Embodiment 4 is a wallpack light fixture comprising a housing having two adjacent body portions each defining an internal volume; at least one light source mounted within the internal volume of the first body portion; a power supply disposed in the internal volume of the second body portion; and a rear conduit entry extending from the exterior of the rear wall to the internal volume of the second body portion.

Embodiment 5 is a wallpack light fixture comprising a housing having two adjacent body portions each defining an internal volume; at least one light source mounted within the internal volume of the first body portion; a power supply disposed in the internal volume of the second body portion; a driver bracket mount coupled to the exterior face of the power supply, wherein the driver bracket mount is disposed within the internal volume of the second body portion; and a terminal bracket mount, wherein the terminal bracket mount overlies the exterior face of the driver bracket mount.

Having described the invention in detail, it will be apparent that modifications and variations are possible without departing from the scope of the invention defined in the appended claims.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

The invention claimed is:

1. A wallpack light fixture, comprising:

a housing having a front, a back, and a height, the housing including, adjacent upper and lower body portions each defining an internal volume, wherein the upper body portion is above the lower body portion along the height of the housing, wherein the lower body portions comprises:

at least one side conduit entry; and at least one side conduit mounting arm having a first end and a second end, wherein the first end is coupled to the at least one side conduit entry and wherein the second end terminates in a flat surface;

at least one light source mounted within the internal volume of the upper body portion; and a power supply disposed in the internal volume of the lower body portion.

2. The apparatus of claim 1 further comprising a plurality of heat sink fins on the back of the housing, wherein each of the heat sink fins extends continuously and heightwise from the lower body portion to the upper body portion.

3. The apparatus of claim 1 further comprising a pivotally attached door disposed on the lower body portion.

4. The apparatus of claim 3 wherein the pivotally attached door comprises a swinging mount with a flange capable of interlocking with a hinge bracket disposed on the housing.

5. The apparatus of claim 3 wherein a grounding conductor connects the housing and the door.

6. The apparatus of claim 3 wherein the internal volume of the second body portion is exposed when the pivotally attached door is hanging freely.

7. The apparatus of claim 3 wherein the pivotally attached door remains open in a locked position when the flange is interlocked with the hinge bracket.

8. The apparatus of claim 3 wherein the pivotally attached door can be removed from the hinge bracket without the use of tools or fasteners.

9. The apparatus of claim 1 further comprising a raceway disposed between the upper and lower body portions to connect the power supply to the light source.

10. The apparatus of claim 1 further comprising a rear conduit entry extending from the exterior of the rear wall to the internal volume of the second body portion.

11. The apparatus of claim 1 further comprising a driver bracket mount coupled to the exterior face of the power supply, wherein the driver bracket mount is disposed within the internal volume of the lower body portion.

12. The apparatus of claim 11 further comprising a terminal bracket mount, wherein the terminal bracket mount overlies the exterior face of the driver bracket mount.

13. The apparatus of claim 1 wherein the housing comprises a thermally conductive material comprising a polymer.

14. The apparatus of claim 2 wherein the heat sink fins are substantially continuous on the exterior rear of the housing.

15. The apparatus of claim 1 wherein the at least one side conduit entry comprises two side conduit entries.

16. The apparatus of claim 15, wherein the first side conduit entry is located on one side of the lower body portion and the second side conduit entry is located on an opposite side of the lower body portion.

* * * * *